US012671910B2

(12) United States Patent
Tang et al.

(10) Patent No.: US 12,671,910 B2
(45) Date of Patent: Jun. 30, 2026

(54) CAMERA ASSEMBLY AND ELECTRONIC DEVICE

(71) Applicant: Huawei Technologies Co., Ltd., Shenzhen (CN)

(72) Inventors: Wei Tang, Tokyo (JP); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 879 days.

(21) Appl. No.: 17/440,538

(22) PCT Filed: Feb. 24, 2020

(86) PCT No.: PCT/CN2020/076393
§ 371 (c)(1),
(2) Date: Sep. 17, 2021

(87) PCT Pub. No.: WO2020/192327
PCT Pub. Date: Oct. 1, 2020

(65) Prior Publication Data
US 2022/0159169 A1 May 19, 2022

(30) Foreign Application Priority Data

Mar. 25, 2019 (CN) .......................... 201910227465.3
Apr. 15, 2019 (CN) .......................... 201910299847.7

(51) Int. Cl.
*H04N 23/745* (2023.01)
*H04N 5/58* (2006.01)
(Continued)

(52) U.S. Cl.
CPC ............. *H04N 23/745* (2023.01); *H04N 5/58* (2013.01); *H04N 13/257* (2018.05);
(Continued)

(58) Field of Classification Search
CPC ...... H04N 23/745; H04N 5/58; H04N 13/257; H04N 23/51; H04N 23/54; H04N 23/957;
(Continued)

(56) References Cited

U.S. PATENT DOCUMENTS

| | | | |
|---|---|---|---|
| 8,531,542 B2 | 9/2013 | Cote et al. | |
| 2012/0008024 A1* | 1/2012 | Takimoto | ............... H04N 25/17 257/E31.127 |

(Continued)

FOREIGN PATENT DOCUMENTS

| | | |
|---|---|---|
| CN | 105074513 A | 11/2015 |
| CN | 105915807 A | 8/2016 |

(Continued)

*Primary Examiner* — Sinh Tran
*Assistant Examiner* — Zhenzhen Wu
(74) *Attorney, Agent, or Firm* — Conley Rose, P.C.

(57) ABSTRACT

A camera assembly includes an infrared laser system, a camera, a flicker detector, and a light-filtering piece. The infrared laser system has an out-light surface. Infrared emitted by the infrared laser system propagates outside of the camera assembly through the out-light surface. The out-light surface of the infrared laser system, an in-light surface of the camera, and an in-light surface of the flicker detector face a same direction and are staggered from each other. The light-filtering piece covers the in-light surface of the flicker detector and is configured to filter out infrared. The flicker detector is configured to detect a frequency of visible light in external light filtered by the light-filtering piece. When the camera assembly is applied to an electronic device, photographing performance of the electronic device is good.

20 Claims, 10 Drawing Sheets

(51) Int. Cl.

| | |
|---|---|
| *H04N 13/257* | (2018.01) |
| *H04N 23/51* | (2023.01) |
| *H04N 23/54* | (2023.01) |
| *H04N 23/957* | (2023.01) |
| *H04N 13/254* | (2018.01) |

(52) U.S. Cl.

CPC ............ *H04N 23/51* (2023.01); *H04N 23/54* (2023.01); *H04N 23/957* (2023.01); *H04N 13/254* (2018.05)

(58) Field of Classification Search

CPC ...... H04N 13/254; H04N 23/45; H04N 23/55; H04N 23/56; H04N 23/57; H04N 13/204; H04N 23/16; H04N 23/50; H04N 23/73; H04N 23/90; H04M 1/22; H04M 1/0264; H04M 1/026; H04M 1/0262; H04M 1/0266

See application file for complete search history.

(56) References Cited

U.S. PATENT DOCUMENTS

| | | | | |
|---|---|---|---|---|
| 2014/0350146 | A1* | 11/2014 | Tsubouchi | ............ G02B 5/208 524/94 |
| 2015/0378033 | A1 | 12/2015 | Suponnikov et al. | |
| 2016/0139308 | A1 | 5/2016 | Kim et al. | |
| 2016/0249003 | A1 | 8/2016 | Miwa | |
| 2017/0142307 | A1* | 5/2017 | Kim | ........................ H04N 23/51 |
| 2017/0142315 | A1 | 5/2017 | Tsukagoshi | |
| 2018/0059298 | A1* | 3/2018 | Lee | ........................... G02B 5/20 |
| 2018/0081093 | A1* | 3/2018 | Wang | ..................... H04N 23/20 |
| 2018/0241861 | A1* | 8/2018 | Kim | ......................... H04M 1/18 |
| 2019/0058814 | A1 | 2/2019 | Jung et al. | |
| 2019/0104247 | A1 | 4/2019 | Feng et al. | |
| 2020/0022239 | A1* | 1/2020 | Hung | ..................... H05B 45/14 |
| 2020/0176496 | A1* | 6/2020 | Kimura | ................. H04N 23/55 |
| 2021/0250509 | A1* | 8/2021 | Kim | ....................... H04N 23/55 |
| 2021/0337120 | A1* | 10/2021 | Zhou | ..................... H04N 23/80 |

FOREIGN PATENT DOCUMENTS

| | | | | |
|---|---|---|---|---|
| CN | 106973285 | A | | 7/2017 |
| CN | 107580185 | A | | 1/2018 |
| CN | 108023982 | A | * | 5/2018 |
| CN | 110049214 | A | | 7/2019 |
| EP | 3920521 | A1 | | 12/2021 |
| JP | H07154808 | A | | 6/1995 |
| JP | 2015161731 | A | * | 9/2015 |
| JP | 2017225073 | A | | 12/2017 |
| JP | 2018060129 | A | | 4/2018 |
| JP | 2019032371 | A | | 2/2019 |
| JP | 2020129756 | A | | 8/2020 |
| KR | 20190020533 | A | | 3/2019 |

* cited by examiner

CAMERA ASSEMBLY AND ELECTRONIC DEVICE

CROSS-REFERENCE TO RELATED APPLICATIONS

This application is a U.S. National Stage of International Patent Application No. PCT/CN2020/076393 filed on Feb. 24 2020, which claims priority to Chinese Patent Application No. 201910227465.3 filed on Mar. 25, 2019 and Chinese Patent Application No. 201910299847.7 filed on Apr. 15, 2019. All of the aforementioned applications are hereby incorporated by reference in their entireties.

TECHNICAL FIELD

This application relates to the field of electronic product technologies, and in particular, to a camera assembly and an electronic device.

BACKGROUND

With development of science and technology and demands of the market, users raise increasingly high requirements on photographing performance of mobile phones. A conventional mobile phone is generally provided with a camera and a flicker detector (flicker detector). The flicker detector is mainly configured to detect a frequency of visible light (for example, a frequency of visible light emitted by a fluorescent light or a computer screen) in an environment in which a photographed subject is located, and transmits detected data to a controller of the mobile phone in a form of an electrical signal. The controller of the mobile phone adjusts a photographing parameter of the camera based on the detected data to resolve a problem that an image photographed by the camera has water ripples. However, when the flicker detector and the camera are used in coordination, water ripples are still generated in an image photographed by the camera, which reduces photographing performance of the mobile phone.

SUMMARY

Embodiments of this application provide a camera assembly and an electronic device, to improve photographing performance of the camera assembly and the electronic device.

According to a first aspect, an embodiment of this application provides a camera assembly. The camera assembly includes an infrared laser module, a camera, a flicker detector, and a light-filtering piece. The infrared laser module has an out-light surface. Infrared emitted by the infrared laser module propagates to an outside of the camera assembly through the out-light surface. The camera can be configured to capture a color image of a photographed subject. The photographed subject refers to a scene or person that needs to be photographed by a user, and the person includes the user. The out-light surface of the infrared laser module, an in-light surface of the camera, and an in-light surface of the flicker detector face a same direction and are staggered from each other. In other words, the out-light surface of the infrared laser module, the in-light surface of the camera, and the in-light surface of the flicker detector do not overlap. The light-filtering piece covers the in-light surface of the flicker detector. The light-filtering piece is configured to filter out infrared. The flicker detector is configured to detect a frequency of visible light in external light filtered by the light-filtering piece.

In this embodiment, with the in-light surface of the flicker detector being covered by the light-filtering piece, the infrared emitted by the infrared laser module is filtered out by the light-filtering piece before the flicker detector detects the frequency of the visible light in the external light. In this case, the external light detected by the flicker detector is no longer mixed with infrared or is mixed with infrared having low signal strength, so that a signal of the visible light detected by the flicker detector is not drowned or interfered with by a signal of the infrared, thereby ensuring accuracy of the frequency of the visible light detected by the flicker detector. Therefore, when the camera and the flicker detector work in coordination, an image photographed by the camera no longer has water ripples, and photographing performance of the camera assembly is improved.

In an embodiment, the infrared laser module is configured to obtain depth information of the photographed subject. The camera assembly further includes an image processor. The image processor receives the depth information obtained by the infrared laser module and receives the color image captured by the camera. The image processor combines the depth information with the color image for processing by using an algorithm, to generate a color image with depth information, thereby improving the photographing performance of the camera assembly.

In this embodiment, the user may photograph a color image with depth information through coordinated use of the infrared laser module, the flicker detector, the light-filtering piece, and the camera, and the image has no water ripples. Specifically, the infrared laser module casts infrared to the scene or person that needs to be photographed. Then, the infrared laser module receives infrared to obtain accurate depth information of the scene or person that needs to be photographed. In addition, the camera and the flicker detector work in coordination to obtain a color image without water ripples. In this case, the depth information and the color image are processed by the image processor to obtain a color image with depth information, and the formed image has no water ripple.

In an embodiment, the light-filtering piece includes a light-filtering substrate and a light-filtering layer disposed on the light-filtering substrate. The light-filtering layer is configured to filter out infrared having a wavelength ranging from 800 nanometers to 1600 nanometers in an environment in which the photographed subject is located. In this embodiment, before the flicker detector detects the frequency of the visible light in the external light, the light-filtering layer filters out the infrared having the wavelength ranging from 800 nanometers to 1600 nanometers in the environment in which the photographed subject is located, to reduce or eliminate the infrared having the wavelength ranging from 800 nanometers to 1600 nanometers in the external light, thereby ensuring normal work of the flicker detector.

In an embodiment, the light-filtering substrate includes a first surface and a second surface that are oppositely disposed, and the first surface and the second surface each are provided with the light-filtering layer. In this case, when the external light propagates to the light-filtering piece, the light-filtering layers on the first surface and the second surface both can filter out the infrared in the external light, that is, the light-filtering piece can perform secondary filtering on the external light, thereby improving a light-filtering capability of the light-filtering piece.

In an embodiment, the light-filtering layer includes a plurality of sequentially stacked film-coated layers. A material of the film-coated layers comprises at least one of silicon dioxide or titanium dioxide. In this case, the film-coated layers can filter out 99% of the infrared, that is, most of the infrared in the external light can be filtered out by the light-filtering piece. Therefore, when the light-filtering piece is applied to the camera assembly, infrared in the external light filtered by the light-filtering piece does not affect detection work of the flicker detector.

Optionally, the film-coated layers may be formed on the light-filtering substrate by using a thermal evaporation process or a magnetron sputtering process.

In an embodiment, a material of the light-filtering substrate includes resin for absorbing infrared. A thickness of the light-filtering substrate ranges from 0.05 millimeters to 0.15 millimeters. It can be understood that, when the material of the light-filtering substrate includes resin, the light-filtering substrate can effectively bear the film-coated layers. In addition, with the thickness of the light-filtering substrate set to be in the range of 0.05 millimeters to 0.15 millimeters, the camera assembly can be disposed in a thinned manner when the light-filtering piece is applied to the camera assembly. In another embodiment, the material of the light-filtering substrate may alternatively include a glass substrate. A thickness of the light-filtering substrate ranges from 0.1 millimeters to 0.3 millimeters.

In an embodiment, the resin is used to absorb infrared. In this case, the light-filtering layer in coordination with the light-filtering substrate can filter out 99.999% of the infrared, that is, the light-filtering piece can filter out almost all infrared in the external light. In this way, infrared in the external light filtered by the light-filtering piece does not affect the detection work of the flicker detector.

Optionally, the light-filtering layer in coordination with the light-filtering substrate can allow more than 70% of the visible light to pass through, to ensure that the light-filtering piece does not affect the flicker detector in detecting the frequency of the visible light in the external light.

Further, the light-filtering piece includes a base. The base is a frame-shaped structure. The base encloses and is connected to a peripheral side surface of the light-filtering substrate.

In this embodiment, the base encloses and is connected to the peripheral side surface of the light-filtering substrate, to avoid damaging or cracking the light-filtering substrate and the light-filtering layer due to a collision of the light-filtering substrate with an external object.

Optionally, the base is integrally formed with the light-filtering substrate. In this case, compared with additionally preparing the base and then mounting the base on the light-filtering substrate, in this embodiment, the base is integrally formed with the light-filtering substrate to reduce a preparation process of the light-filtering piece, thereby reducing input costs of the light-filtering piece.

Further, an inner side of the base encloses a light-filtering space. The in-light surface of the flicker detector is located in the light-filtering space, that is, the in-light surface of the flicker detector is covered by the light-filtering piece. In this case, when a peripheral component (for example, the infrared laser module) of the flicker detector emits infrared, the base can effectively isolate this part of infrared, to prevent the infrared emitted by the peripheral component from affecting the work of the flicker detector, thereby ensuring that an image photographed by the camera has no water ripples.

Optionally, the base encloses and is connected to the peripheral side surface of the light-filtering substrate detachably. In this case, when the base is damaged or cracked, the base can be detached from the light-filtering substrate to facilitate replacement with a new base, in other words, replacing the entire light-filtering piece is avoided, thereby reducing the input costs of the light-filtering piece.

Further, a hardness of the base is higher than that of the light-filtering substrate. In this case, because the base is not prone to damage, the light-filtering piece has better stability.

In an embodiment, the camera assembly includes an ambient light sensor. The ambient light sensor is configured to detect a color temperature of the external light. The ambient light sensor and the flicker detector are a two-in-one component, to be specific, the ambient light sensor and the flicker detector are integrated into one component, so that the ambient light sensor and the flicker detector form a whole. In this embodiment, in one aspect, the ambient light sensor configured to detect the color temperature of the external light is disposed, so that when the ambient light sensor coordinates with the camera, the camera can photograph a relatively good image by using color temperature data, to improve the photographing performance of the camera assembly. In another aspect, the ambient light sensor and the flicker detector form a two-in-one component to simplify an internal structure of the camera assembly, thereby reducing an occupied internal space of the camera assembly.

In an embodiment, the camera assembly includes a mounting bracket. The mounting bracket has an accommodation space. The infrared laser module is partially or totally disposed in the accommodation space. The mounting bracket is provided with a through hole. The through hole communicates with the accommodation space, and the through hole is configured to allow the infrared emitted by the infrared laser module to pass through.

It can be understood that, when the infrared laser module is partially or totally disposed in the accommodation space, the mounting bracket can protect the infrared laser module, to avoid damaging the infrared laser module due to a collision with another component. In addition, when the infrared emitted by the infrared laser module causes optical crosstalk, a peripheral side wall of the mounting bracket can effectively isolate the infrared, to avoid the infrared crosstalk reaching the in-light surface of the flicker detector, thereby preventing the infrared emitted by the infrared laser module from interfering with the work of the flicker detector.

In an embodiment, the camera assembly includes a mounting bracket. The mounting bracket has an accommodation space. The mounting bracket is provided with a first through hole and a second through hole that are spaced. Both the first through hole and the second through hole communicate with the accommodation space. The infrared laser module is partially or totally located in the accommodation space. The flicker detector is partially or totally located in the accommodation space. The first through hole is configured to allow the external light to pass through, so that the external light irradiates the flicker detector, that is, the flicker detector captures the frequency of the visible light in the external light through the first through hole. The second through hole is configured to allow the infrared emitted by the infrared laser module to pass through, that is, the infrared laser module casts the infrared to the outside of the camera assembly through the second through hole.

In this embodiment, when the infrared laser module is partially or totally located in the accommodation space and the flicker detector is partially or totally located in the accommodation space, the infrared laser module, the flicker detector, and the mounting bracket form a whole, thereby improving integrity of the camera assembly. In addition, the mounting bracket can protect the infrared laser module and the flicker detector, to avoid damaging the infrared laser module and the flicker detector due to a collision with another component.

In an embodiment, the flicker detector is partially disposed in the first through hole, and the in-light surface of the flicker detector is located in the first through hole. In this case, when the infrared emitted by the infrared laser module causes optical crosstalk, a hole wall of the first through hole can effectively isolate the infrared emitted by the infrared laser module, to avoid the infrared crosstalk reaching the in-light surface of the flicker detector, thereby preventing the infrared emitted by the infrared laser module from interfering with the work of the flicker detector.

In an embodiment, the mounting bracket includes a top wall. It can be understood that, the mounting bracket includes a peripheral side wall. The peripheral side wall is connected to a peripheral side surface of the top wall. The top wall and the peripheral side wall enclose the accommodation space. An opening of the first through hole and an opening of the second through hole are located in the top wall. The light-filtering piece is mounted on the top wall and covers a part of the first through hole.

It can be understood that, when the flicker detector is located in the accommodation space, infrared radiated by another component of the camera assembly can all be isolated by the peripheral side wall, that is, the infrared radiated by the another component of the camera assembly can be prevented from interfering with the work of the flicker detector. In addition, the light-filtering piece is mounted on the top wall and partially covers the first through hole, so that when the infrared emitted by the infrared laser module causes optical crosstalk, the light-filtering piece can filter out the infrared, to prevent the infrared emitted by the infrared laser module from entering the in-light surface of the flicker detector, that is, prevent the infrared emitted by the infrared laser module from interfering with the work of the flicker detector.

In an embodiment, the mounting bracket is provided with an optical crosstalk resistance piece. A material of the optical crosstalk resistance piece includes a material for absorbing or reflecting infrared. The optical crosstalk resistance piece is located between the flicker detector and the infrared laser module. In this case, when the infrared emitted by the infrared laser module causes optical crosstalk, the optical crosstalk resistance piece can effectively isolate the infrared, to avoid the infrared crosstalk reaching the in-light surface of the flicker detector, thereby preventing the infrared emitted by the infrared laser module from interfering with the work of the flicker detector.

In an embodiment, the infrared laser module includes an infrared transmitter and an infrared receiver. It can be understood that, the infrared transmitter is configured to cast infrared to the photographed subject. The infrared receiver is configured to receive infrared reflected by the photographed subject, and obtain depth information of the photographed subject based on the received infrared. The infrared transmitter is partially or totally located in the accommodation space. The infrared receiver is partially or totally located in the accommodation space. The second through hole includes a first hole portion and a second hole portion that are spaced. The first hole portion and the second hole portion communicate with the accommodation space. The first hole portion is configured to allow the infrared emitted by the infrared transmitter to pass through and be cast to the photographed subject, that is, the infrared transmitter casts the infrared to the photographed subject through the first hole portion. The second hole portion is configured to allow the infrared reflected by the photographed subject to pass through and be cast to the infrared receiver, that is, the infrared receiver receives, through the second hole portion, the infrared reflected by the photographed subject.

In this embodiment, the first hole portion and the second hole portion are disposed, so that when the infrared transmitter emits the infrared, the infrared does not directly cause optical crosstalk to an in-light surface of the infrared receiver, thereby ensuring normal work of the infrared receiver. When the infrared transmitter and the infrared receiver are disposed in the accommodation space, the mounting bracket can protect the infrared transmitter and the infrared receiver, to avoid damaging the infrared transmitter and the infrared receiver due to a collision with another component.

According to a second aspect, this application provides an electronic device. The electronic device includes a controller and the foregoing camera assembly. The controller is a central processing unit (central processing unit, CPU) of the electronic device. The camera and the flicker detector are separately electrically connected to the controller. The controller is configured to receive an electrical signal, of a frequency of visible light, that is sent by the flicker detector, and adjust a photographing parameter of the camera based on the electrical signal. For example, the photographing parameter is an exposure time.

In this embodiment, with the in-light surface of the flicker detector being covered by the light-filtering piece, infrared emitted by the infrared laser module is filtered out by the light-filtering piece before the flicker detector detects the frequency of the visible light in external light. In this case, the external light detected by the flicker detector is no longer mixed with infrared or is mixed with infrared having low signal strength, so that a signal of the visible light detected by the flicker detector is not drowned or interfered with by a signal of the infrared. The flicker detector converts the captured frequency of the visible light into the electrical signal, and sends the electrical signal to the controller. The controller controls the camera to adjust the photographing parameter and capture a color image of the photographed subject. In this case, the image photographed by the camera no longer has water ripples, and photographing performance of the electronic device is improved.

It can be understood that, compared with integrally forming the light-filtering piece in the flicker detector, in this embodiment, the light-filtering piece covers the in-light surface of the flicker detector, and the camera assembly features a simple structure, a low cost, and convenient assembling. In addition, when either the light-filtering piece or the flicker detector is damaged, the damaged light-filtering piece or the damaged flicker detector can be easily replaced in time, and an undamaged component can still be used, to ensure that the undamaged component can be reused and utilization of the undamaged component can be increased.

In addition, with the in-light surface of the flicker detector being covered by the light-filtering piece, infrared (including infrared emitted by an external device of the electronic device) in an environment in which the photographed subject is located can also be filtered out by the light-filtering piece before the flicker detector detects the frequency of the visible light in the external light. In this case, the external light detected by the flicker detector is no longer mixed with infrared or is mixed with infrared having low signal strength, so that the frequency of the visible light detected by the flicker detector is not drowned or interfered with by a signal of the infrared outside the electronic device, thereby ensuring accuracy of the frequency of the visible light detected by the flicker detector.

In an embodiment, the electronic device includes a screen and a battery cover that are oppositely disposed. The screen is configured to display an image. The controller and the camera assembly are located between the screen and the battery cover. The light-filtering piece is disposed between the battery cover and the flicker detector. In this case, the out-light surface of the infrared laser module, the in-light surface of the camera, and the in-light surface of the flicker detector face the battery cover. The camera is configured to photograph an image on a side of the battery cover that is away from the screen, that is, the camera is a rear camera.

In this embodiment, the light-filtering piece is disposed between the battery cover and the flicker detector. In this way, in a process in which the rear camera and the flicker detector are used in coordination, or in a process in which the infrared laser module, the flicker detector, and the rear camera are used in coordination, a problem that an image photographed by the rear camera has water ripples is resolved, thereby improving photographing performance of the rear camera of the electronic device.

In an embodiment, the light-filtering piece is fixed on a surface of the battery cover that faces the screen. Optionally, the light-filtering piece is fixed on a surface of the battery cover that faces the screen by using adhesive. In this case, the light-filtering piece fits tightly with the battery cover, so that the light-filtering piece and the battery cover are arranged in a more compact manner, to be specific, an internal space of the electronic device is not wasted because no large space is left between the light-filtering piece and the battery cover. In addition, with the light-filtering piece bonded to the battery cover, a process is simple and an operation is convenient.

In an embodiment, the light-filtering piece includes transparent optical clear adhesive. The transparent optical clear adhesive is disposed on a side of the light-filtering substrate that is away from the light-filtering layer. The transparent optical clear adhesive is bonded to the surface of the battery cover that faces the screen. Therefore, compared with additionally providing an adhesion agent and fixing the light-filtering piece by using the adhesion agent, in this embodiment, the transparent optical clear adhesive is disposed on the side of the light-filtering substrate that is away from the light-filtering layer, so that when the light-filtering piece is fixed on the battery cover, the transparent optical clear adhesive is directly bonded to the battery cover, thereby improving convenience in using the light-filtering piece. In addition, with the light-filtering piece bonded to the battery cover by using the transparent optical clear adhesive, a process is simple and an operation is convenient.

In an embodiment, the battery cover is provided with a light-transmitting portion. The light-filtering piece covers the light-transmitting portion. The light-filtering piece is configured to filter out infrared in external light that passes through the light-transmitting portion. Optionally, when the battery cover is a transparent material, a partial surface of the battery cover that faces the screen is coated with an ink layer to form a light-shielding portion. A surface not coated with an ink layer forms the light-transmitting portion. The light-filtering piece is bonded to the battery cover and covers the light-transmitting portion.

In another embodiment, the battery cover is provided with a first light inlet. The first light inlet forms the light-transmitting portion.

In an embodiment, the surface of the battery cover that faces the screen is provided with an anti-explosion film. The light-filtering piece is fixed on a surface of the anti-explosion film that faces the flicker detector. In this case, when the battery cover falls off and hits another object, the anti-explosion film can prevent the battery cover from explosion. In this case, when the light-filtering piece is fixed on the surface of the anti-explosion film that faces the flicker detector, damage to the light-filtering piece caused by fall-off of the electronic device can be avoided. In another embodiment, the battery cover is provided with an NCVM (non conductive vacuum metalization, non conductive metalization) film. The light-filtering piece is fixed on a surface of the NCVM film that faces the flicker detector.

In an embodiment, the battery cover is provided with a light-transmitting portion. The camera assembly includes a flash. The flash is configured to fill in light on the photographed subject when the camera is in a photographing mode. The flash is located between the screen and the battery cover, and an out-light surface of the flash faces the light-transmitting portion. A projection of the flash on a display surface of the screen partially or totally overlaps a projection of the light-transmitting portion on the display surface of the screen. A projection of the light-filtering piece on the display surface of the screen partially or totally overlaps the projection of the light-transmitting portion on the display surface of the screen. In other words, light emitted by the flash propagates to an outside of the electronic device through the light-transmitting portion. The flicker detector captures the frequency of the visible light in the external light through the light-transmitting portion. In this case, the flicker detector and the flash share one such light-transmitting portion, to avoid deterioration of use experience of the electronic device resulted from degraded appearance consistency of the battery cover caused by disposing a plurality of light-transmitting portions on the batter cover.

In an embodiment, the camera assembly includes an LED cover, the LED cover is mounted on the battery cover, and the LED cover covers the light-transmitting portion. When the flash emits light, the LED cover can concentrate the light in a specific region, to effectively fill in light on the photographed subject. In addition, the LED cover may also soften the light emitted by the flash, to prevent the light emitted by the flash from injuring eyes of a photographed person due to excessively high intensity. Both the flash and the flicker detector are located on a side of the LED cover that is away from the light-transmitting portion. The LED cover includes a first light-transmitting portion and a second light-transmitting portion connected to the first light-transmitting portion. The projection of the flash on the display surface of the screen partially or totally overlaps a projection of the first light-transmitting portion on the display surface of the screen, that is, a part or a whole of the flash is directly opposite to the first light-transmitting portion. The first light-transmitting portion is configured to concentrate the light emitted by the flash in a specific region. The light-filtering piece is fixed on a side of the second light-transmitting portion that faces the flicker detector.

In this embodiment, the second light-transmitting portion is disposed, and the second light-transmitting portion is fixed on the battery cover, so that the first light-transmitting portion is fixed on the battery cover. Therefore, disposing the second light-transmitting portion can ensure that a light concentration function of the first light-transmitting portion is not affected by a fixing mode (for example, when a double-sided tape is directly bonded to the first light-transmitting portion, the double-sided tape may affect the light concentration function of the first light-transmitting portion) while the first light-transmitting portion can be fixed on the battery cover.

In addition, the second light-transmitting portion may be further configured to fix the light-filtering piece. In this way, in one aspect, the light-filtering piece is protected by the second light-transmitting portion, that is, the light-filtering piece is prevented from colliding with another component in the electronic device; and in another aspect, waste of an internal space of the electronic device caused by additionally disposing a space inside the electronic device for fixing the light-filtering piece is avoided, thereby improving internal space utilization of the electronic device. Therefore, the second light-transmitting portion has a function of "one for three purposes".

In an embodiment, a thickness of the first light-transmitting portion in a first direction is greater than a thickness of the second light-transmitting portion in the first direction. The first direction is a direction perpendicular to the display surface of the screen, that is, the first direction is a thickness direction of the electronic device. The light-filtering piece is fixed on a surface of the second light-transmitting portion that faces the flicker detector.

In this embodiment, the thickness of the second light-transmitting portion in the first direction is less than the thickness of the first light-transmitting portion in the first direction. Therefore, in one aspect, the second light-transmitting portion can free up an extra space in the first direction, and in this case, when the light-filtering piece is fixed on the second light-transmitting portion, the light-filtering piece can effectively utilize this part of space, so that waste of an internal space of the electronic device caused by additionally disposing a space inside the electronic device for fixing the light-filtering piece is avoided, thereby improving the space utilization of the electronic device; and in another aspect, a material used by the second light-transmitting portion is significantly reduced, and input costs of the LED cover are also reduced.

Optionally, the second light-transmitting portion is a ring structure.

In an embodiment, the camera assembly includes an ambient light sensor. The ambient light sensor and the flicker detector are a two-in-one component. The second light-transmitting portion is provided with a light-homogenizing film. The ambient light sensor is configured to detect a color temperature of external light that passes through the light-homogenizing film. The light-filtering piece is disposed on a surface of the light-homogenizing film that is away from the second light-transmitting portion. When the ambient light sensor is in a working state, the ambient light sensor captures external light that sequentially passes through the LED cover and the light-homogenizing film. In this case, the light-homogenizing film is disposed on the second light-transmitting portion to resolve a problem that the external light is non-uniform due to a texture on the surface of the second light-transmitting portion, so that the ambient light sensor can capture uniform external light.

In addition, the light-filtering piece is fixed on a surface of the light-homogenizing film that faces the flicker detector. It can be understood that, the light-homogenizing film is configured to homogenize light without affecting the frequency of the visible light in the external light. In this case, compared with arranging the light-filtering piece and the light-homogenizing film on an X-Y plane, in this embodiment, the light-filtering piece is fixed on the surface of the light-homogenizing film that faces the flicker detector, to avoid occupying a space of the electronic device on the X-Y plane. In this way, more components can be arranged in the space of the electronic device on the X-Y plane.

In an embodiment, the camera assembly includes a bonding layer. The bonding layer is disposed between the light-homogenizing film and the light-filtering piece. The bonding layer is a ring structure, that is, a middle portion of the bonding layer is a hollow-out region. In this case, the bonding layer can stably fix the light-filtering piece on the light-homogenizing film without affecting the flicker detector in detecting the frequency of the visible light and the ambient light sensor in detecting the color temperature of the external light. Specifically, the flicker detector can capture the frequency of the visible light through the hollow-out region of the bonding layer, and the ambient light sensor can capture the external light through the hollow-out region of the bonding layer. In addition, the bonding layer uses a relatively small amount of material, and this can reduce input costs of the bonding layer.

Optionally, the bonding layer is a double-sided tape. A cost of the double-sided tape is relatively low, so that input costs of the electronic device are reduced.

Optionally, the bonding layer is transparent optical clear adhesive. In this case, when the light-filtering piece is fixed on the light-homogenizing film by using the transparent optical clear adhesive, the transparent optical clear adhesive does not affect or change the frequency of the visible light, thereby ensuring normal work of the flicker detector. In addition, when the bonding layer is transparent optical clear adhesive, the bonding layer can cover the light-filtering piece, that is, the bonding layer has no hollow-out region. In this case, the light-filtering piece is relatively securely connected to the light-homogenizing film.

In an embodiment, a positioning block is disposed on the surface of the second light-transmitting portion that faces the flicker detector. A peripheral side surface of the positioning block abuts against the light-filtering piece. In this case, the light-filtering piece is clamped by the positioning block, so that the light-filtering piece is more securely connected to the second light-transmitting portion. Optionally, the positioning block is a ring structure.

In an implementation, there are a plurality of positioning blocks. The plurality of positioning blocks are distributed at intervals, and the plurality of positioning blocks form a ring structure through enclosure.

In another implementation, there is one positioning block.

In an embodiment, the in-light surface of the flicker detector is located in a space enclosed by the positioning block. In this case, the positioning block can isolate infrared radiated by an internal component of the electronic device, to ensure that the frequency of the visible light in the external light detected by the flicker detector is not interfered with by a signal of the infrared. For example, when infrared emitted by the infrared transmitter causes optical crosstalk, the positioning block can prevent the infrared from propagating to the in-light surface of the flicker detector, thereby preventing the infrared from interfering with the work of the flicker detector.

In an embodiment, the infrared laser module, the camera, and the flicker detector are sequentially arranged along a width direction of the electronic device. In this case, the camera is located between the infrared laser module and the flicker detector, and the camera can effectively isolate the infrared emitted by the infrared laser module. Specifically, when the infrared emitted by the infrared laser module causes optical crosstalk, the camera can prevent the infrared crosstalk from reaching the flicker detector, so that the infrared emitted by the infrared laser module is prevented from interfering with the work of the flicker detector, thereby ensuring that an image photographed by the camera has no water ripple. In another embodiment, arrangement positions of the infrared laser module, the camera, and the flicker detector may not be specifically limited.

In an embodiment, the electronic device includes a battery cover and a screen that are spaced. Both the controller and the camera assembly are located between the screen and the battery cover. The light-filtering piece is disposed between the screen and the flicker detector. In other words, the out-light surface of the infrared laser module, the in-light surface of the camera, and the in-light surface of the flicker detector face the screen. The camera is configured to photograph an image on a side of the screen that is away from the battery cover, that is, the camera is a front camera. For example, the front camera may be configured to take a selfie.

In this embodiment, the light-filtering piece is disposed between the screen and the flicker detector. In this way, in a process in which the front camera and the flicker detector are used in coordination, or in a process in which the infrared laser module, the flicker detector, and the front camera are used in coordination, a problem that an image photographed by the front camera has water ripples is resolved, thereby improving a photographing effect of the front camera of the electronic device.

In an embodiment, the light-filtering piece is fixed on a surface of the screen that faces the flicker detector. Optionally, the light-filtering piece is fixed on a surface of the screen that faces the battery cover by using adhesive. In this case, the light-filtering piece fits tightly with the screen, so that the light-filtering piece and the screen are arranged in a more compact manner, to be specific, an internal space of the electronic device is not wasted because no large space is left between the light-filtering piece and the screen. In addition, with the light-filtering piece bonded to the screen, a process is simple and an operation is convenient.

In an embodiment, the screen includes a display region and a non-display region that encloses a peripheral edge of the display region. The display region can be configured to display an image. The light-filtering piece is located in the non-display region. In this case, the flicker detector captures the frequency of the visible light in the external light in the non-display region. The flicker detector does not affect image display in the display region. In addition, compared with disposing the light-filtering piece in the display region, in this embodiment, the light-filtering piece is disposed in the non-display region, so that a larger space can be freed up in a space in which the display region is located. In this way, when the freed space is used for arranging more components, the electronic device has more functions.

Optionally, the non-display region includes a "notch-shaped" black edge region. In this case, the infrared transmitter, the infrared receiver, the camera, and the flicker detector are arranged along the width direction of the electronic device, and the infrared transmitter, the infrared receiver, the camera, and the flicker detector are located in the "notch-shaped" black edge region.

Optionally, the non-display region includes a "droplet-shaped" black edge region. In this case, the infrared transmitter, the infrared receiver, the camera, and the flicker detector are arranged in the "droplet-shaped" black edge region.

BRIEF DESCRIPTION OF DRAWINGS

To describe the technical solutions in the embodiments of this application or in the background, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1:
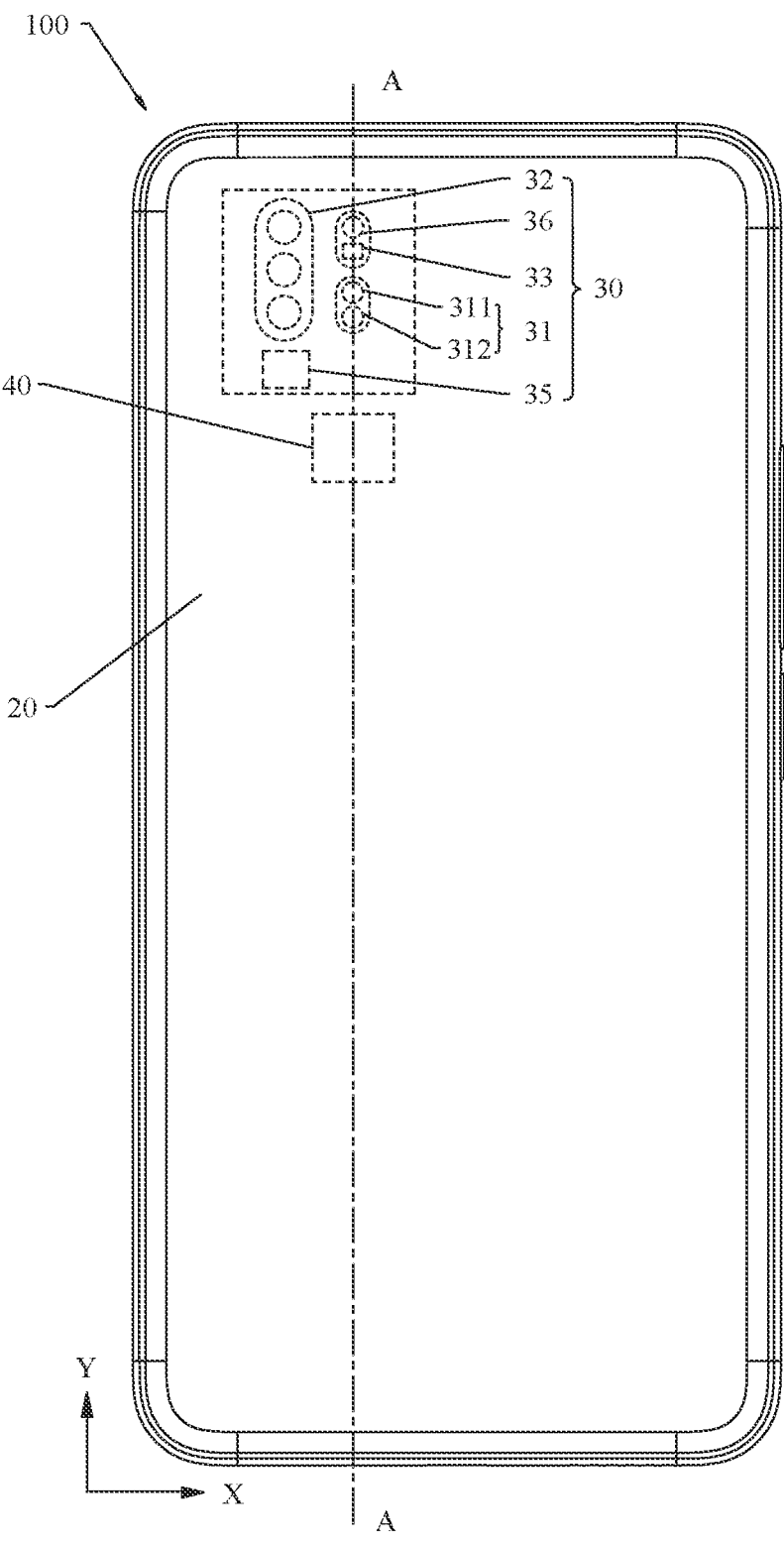
FIG. 1 is a schematic structural diagram of an implementation of an electronic device according to an embodiment of this application.
Figure 2:
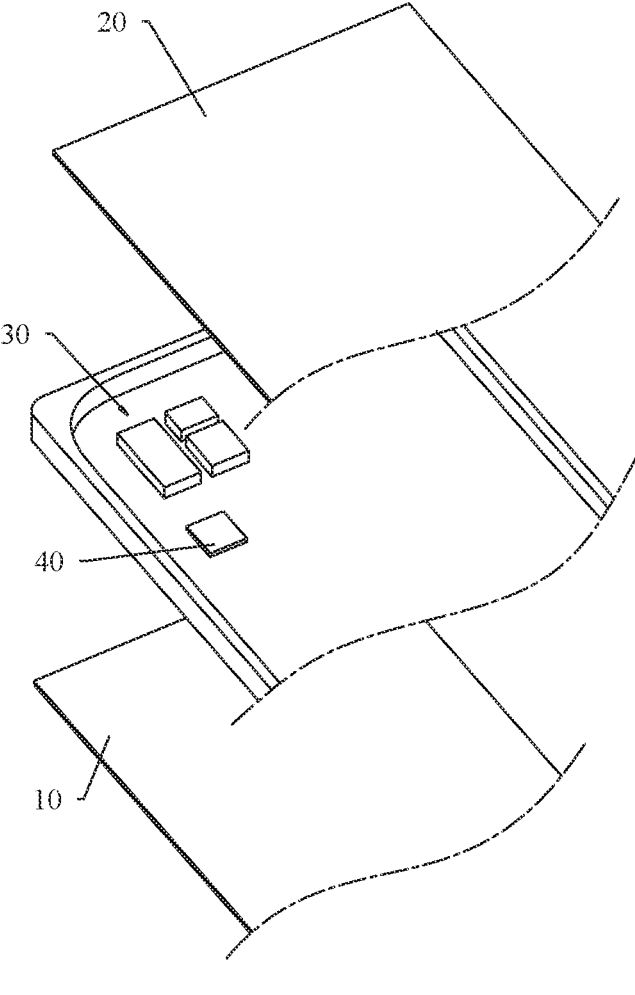
FIG. 2 is a schematic exploded diagram of the electronic device shown in FIG. 1.

FIG. 1 is a schematic structural diagram of an implementation of an electronic device 100 according to an embodiment of this application. FIG. 2 is a schematic exploded diagram of the electronic device 100 shown in FIG. 1. The electronic device 100 may be an electronic device such as a tablet, a mobile phone, a camera, a personal computer, a notebook computer, a vehicle-mounted device, or a wearable device. The electronic device 100 in the embodiment shown in FIG. 1 is described by using a mobile phone as an example. For ease of description, a definition is provided with reference to the electronic device 100 in a first angle of view. A width direction of the electronic device 100 is defined as an X axis. A length direction of the electronic device 100 is defined as a Y axis. A thickness direction of the electronic device 100 is defined as a Z axis.

Referring to FIG. 2, the electronic device 100 includes a screen 10, a battery cover 20, a camera assembly 30, and a controller 40. The screen 10 may be a flexible screen or a rigid screen. In addition, the screen 10 is a touchscreen. The screen 10 can generate a touch signal. The battery cover 20 and the screen 10 are oppositely disposed. The battery cover 20 is a rear cover of the electronic device 100. The battery cover 20 can protect an internal component of the electronic device 100. In addition, the camera assembly 30 and the controller 40 are located between the screen 10 and the battery cover 20. The camera assembly 30 can be configured to capture light reflected by a photographed subject, to form an image. The photographed subject refers to a scene or person that needs to be photographed by the electronic device 100, and the person includes a user. The controller 40 may be a central processing unit (central processing unit, CPU) of the electronic device 100. The controller 40 can receive the touch signal generated by the screen 10, and based on the touch signal, control and trigger application (Application, app) software displayed on a graphical interface of the screen 10. In addition, the controller 40 can further control the camera assembly 30 to photograph an image. Specifically, when the user inputs a photographing instruction, the controller 40 receives the photographing instruction. The controller 40 controls the camera assembly 30 to photograph the photographed subject based on the photographing instruction. With reference to FIG. 1, the camera assembly 30 can capture, through the battery cover 20, the light reflected by the photographed subject, to form an image. In addition, a location and size of the controller 40 are not limited to a location and size shown in FIG. 1, and the location and size of the controller 40 are not specifically limited in this embodiment.

Figure 3:
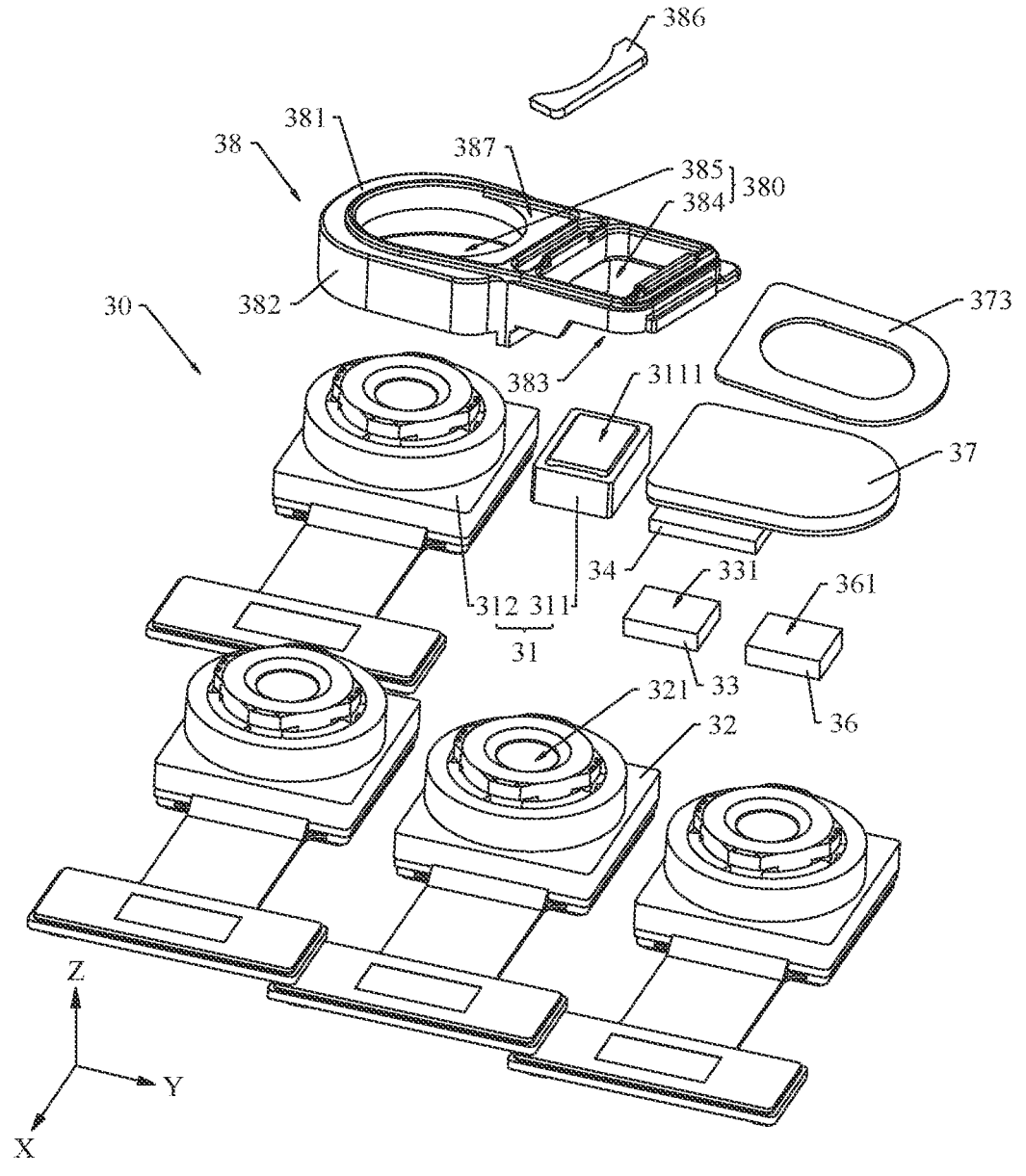
FIG. 3 is a local schematic structural diagram of an implementation of a camera assembly of the electronic device shown in FIG. 2.

FIG. 3 is a local schematic structural diagram of an implementation of the camera assembly 30 of the electronic 100 device shown in FIG. 2. The camera assembly 30 includes an infrared laser module 31, a camera 32, a flicker detector (flicker detector) 33, and a light-filtering piece 34. The infrared laser module 31 has an out-light surface 3111. Infrared emitted by the infrared laser module 31 propagates to an outside of the electronic device 100 through the out-light surface 3111. The camera 32 has an in-light surface 321. The camera 32 can be configured to capture a color image of the photographed subject. A quantity of cameras 32 is not limited to three given in FIG. 3. There may be one or two or even more than three cameras 32. When there are a plurality of cameras 32, the plurality of cameras 32 are randomly arranged on an X-Y plane. For example, the plurality of cameras 32 are arranged along an X-axis direction or a Y-axis direction. The plurality of cameras 32 may include at least two of a wide-angle camera, a long-focus camera, a color camera, or a black/white camera. Certainly, the camera 32 may alternatively be one color camera. With reference to FIG. 1, the infrared laser module 31 and the camera 32 are arranged along the X-axis direction. The camera 32 and the flicker detector 33 are arranged along the X-axis direction. The infrared laser module 31 and the flicker detector 33 are arranged along the Y-axis direction. In this case, the infrared laser module 31, the camera 32, and the flicker detector 33 are arranged in a relatively compact manner, to be specific, the infrared laser module 31, camera 32, and the flicker detector 33 are arranged centrally in one region, thereby increasing internal space utilization of the electronic device 100.

Still referring to FIG. 3, the out-light surface 3111 of the infrared laser module 31, the in-light surface 321 of the camera 32, and an in-light surface 331 of the flicker detector 33 face a same direction and are staggered from each other. That is, the out-light surface 3111 of the infrared laser module 31, the in-light surface 321 of the camera 32, and the in-light surface 331 of the flicker detector 33 do not overlap. The light-filtering piece 34 covers the in-light surface 331 of the flicker detector 33. In other words, a projection of the light-filtering piece 34 on a plane in which the in-light surface 331 of the flicker detector 33 is located overlaps the in-light surface 331 of the flicker detector 33, that is, a projection of the in-light surface 331 of the flicker detector 33 on the X-Y plane is located within a projection of the light-filtering piece 34 on the X-Y plane. The light-filtering piece 34 is configured to filter out infrared. The flicker detector 33 is configured to detect a frequency of visible light in external light filtered by the light-filtering piece 34, and the flicker detector 33 forms an electrical signal from captured data. It can be understood that, the external light refers to light emitted by all light sources in an environment in which the photographed subject is located. Moreover, with reference to FIG. 1, the flicker detector 33 and the camera 32 are separately electrically connected to the controller 40. The flicker detector 33 can transfer the generated electrical signal to the controller 40. The controller 40 receives the electrical signal of the frequency of the visible light that is sent by the flicker detector 33, and adjusts a photographing parameter of the camera 32 based on the electrical signal, so that the camera 32 photographs a relatively good image, thereby improving use experience of the electronic device 100. It can be understood that, the photographing parameter includes an exposure time.

In this embodiment, with the in-light surface 331 of the flicker detector 33 being covered by the light-filtering piece 34, the infrared emitted by the infrared laser module 31 is filtered out by the light-filtering piece 34 before the flicker detector 33 detects the frequency of the visible light in the external light. In this case, the external light detected by the flicker detector 33 is no longer mixed with infrared or is mixed with infrared having low signal strength, so that a signal of the visible light detected by the flicker detector 33 is not drowned or interfered with by a signal of the infrared. The flicker detector 33 converts the captured frequency of the visible light into the electrical signal, and sends the electrical signal to the controller 40. The controller 40 controls the camera 32 to adjust the photographing parameter and capture a color image of the photographed subject. In this case, the image photographed by the camera 32 no longer has water ripples, and photographing performance of the electronic device 100 is improved.

It can be understood that, compared with integrally forming the light-filtering piece 34 in the flicker detector 33, in this embodiment, the light-filtering piece 34 covers the in-light surface 331 of the flicker detector 33, and an assembled structure of the camera assembly 30 is simplified, and the camera assembly 30 has a low cost and convenient assembling. In addition, when either the light-filtering piece 34 or the flicker detector 33 is damaged, the damaged light-filtering piece 34 or the damaged flicker detector 33 can be easily replaced in time, and an undamaged component can still be used, to ensure that the undamaged component can be reused and utilization of the undamaged component can be increased.

In addition, with the in-light surface 331 of the flicker detector 33 being covered by the light-filtering piece 34, infrared (including infrared emitted by an external device of the electronic device 100) in an environment in which the photographed subject is located can be filtered out by the light-filtering piece 34 before the flicker detector 33 detects the frequency of the visible light in the external light. In this case, the external light detected by the flicker detector 33 is no longer mixed with infrared or is mixed with infrared having low signal strength, so that the frequency of the visible light detected by the flicker detector 33 is not drowned or interfered with by a signal of the infrared, thereby ensuring accuracy of the frequency of the visible light detected by the flicker detector 33.

Still referring to FIG. 3, the infrared laser module 31 includes an infrared transmitter 311 and an infrared receiver 312. The infrared transmitter 311 is configured to cast infrared to the photographed subject. In this case, an out-light surface of the infrared transmitter 311 is the out-light surface 3111 of the infrared laser module 31. The infrared receiver 312 is configured to receive infrared reflected by the photographed subject, and obtain depth information of the photographed subject based on the received infrared. With reference to FIG. 1, the infrared transmitter 311 and the flicker detector 33 are separately arranged with the camera 32 along the width direction of the electronic device 100, to be specific, the infrared transmitter 311 and the flicker detector 33 are separately arranged with the camera 32 along the X-axis direction. The infrared transmitter 311, the infrared receiver 312, and the flicker detector 33 are arranged along the length direction of the electronic device 100, to be specific, the infrared transmitter 311, the infrared receiver 312, and the flicker detector 33 are arranged along the Y-axis direction. In this case, the infrared transmitter 311, the camera 32, and the flicker detector 33 are arranged in a relatively compact manner, to be specific, the infrared transmitter 311, the camera 32, and the flicker detector 33 are arranged centrally in one region, thereby increasing internal space utilization of the electronic device 100.

In addition, still referring to FIG. 1, the camera assembly 30 further includes an image processor 35. A location and size of the image processor 35 are not limited to a location and size shown in FIG. 1, and the location and size of the image processor 35 are not specifically limited in this embodiment. The image processor 35 is electrically connected to the controller 40. The image processor 35 can receive the depth information obtained by the infrared receiver 312 and receive the color image photographed by the camera 32. Besides, the image processor 35 can combine the depth information with the color image for processing by using an algorithm, to generate a color image with depth information, thereby improving the photographing performance of the electronic device 100.

In this embodiment, the user may photograph a color image with depth information through coordinated use of the infrared transmitter 311, the infrared receiver 312, the flicker detector 33, the light-filtering piece 34, and the camera 32, and the image has no water ripples. Specifically, the infrared transmitter 311 casts infrared to a scene or a person that needs to be photographed, and then the infrared receiver 312 receives reflected infrared to obtain accurate depth information of the scene or person that needs to be photographed. Before the flicker detector 33 detects the frequency of the visible light in the external light, the infrared reflected by the photographed subject is filtered out by the light-filtering piece 34. In this case, the frequency of the visible light captured by the flicker detector 33 is not interfered with by the infrared emitted by the infrared transmitter 311. The flicker detector 33 converts the captured frequency of the visible light into the electrical signal, and sends the electrical signal to the controller 40. The controller 40 controls the camera 32 to adjust the photographing parameter and capture a color image of the photographed subject. The image processor 35 combines the depth information with the color image for processing to form a color image with depth information, and the color image has no water ripple.

In an embodiment, the infrared filtered out by the light-filtering piece 34 has a wavelength ranging from 800 nanometers (nanometer, nm) to 1600 nanometers. Specifically, when the electronic device 100 is used for photographing, another user around the user may also perform photographing by using an electronic device 100. In this case, infrared having a wavelength ranging from 800 nanometers to 1600 nanometers exists in the external light. As a result, a light signal emitted by a light source in the environment is easily covered or interfered with by an infrared signal, and the flicker detector 33 cannot normally detect the frequency of the visible light in the external light. Therefore, before the flicker detector 33 detects the frequency of the visible light in the external light, the light-filtering piece 34 filters out the infrared having the wavelength ranging from 800 nanometers to 1600 nanometers in the environment in which the photographed subject is located, to reduce or eliminate infrared having the wavelength ranging from 800 nanometers to 1600 nanometers in the external light, thereby ensuring normal work of the flicker detector 33.

In an embodiment, the infrared emitted by the infrared transmitter 311 has a wavelength ranging from 800 nanometers to 1600 nanometers. For example, the wavelength of the infrared emitted by the infrared transmitter 311 is one of 850 nanometers, 940 nanometers, 1310 nanometers, and 1500 nanometers. In this case, the infrared emitted by the infrared transmitter 311 is filtered out by the light-filtering piece 34 to reduce or eliminate the infrared emitted by the infrared transmitter 311 in the external light, thereby ensuring that the flicker detector 33 is not interfered with by the infrared emitted by the infrared transmitter 311, that is, ensuring that the flicker detector 33 can work normally.

In this embodiment, the light-filtering piece 34 may be disposed in various forms. In a first implementation, the light-filtering piece 34 is disposed between the battery cover 20 and the flicker detector 33. In a second implementation, the light-filtering piece 34 is fixed on a surface of the battery cover 20 that faces the screen 10. In a third implementation, the light-filtering piece 34 is disposed between the screen 10 and the flicker detector 33. For specific description, refer to the following implementations.

Figure 4:
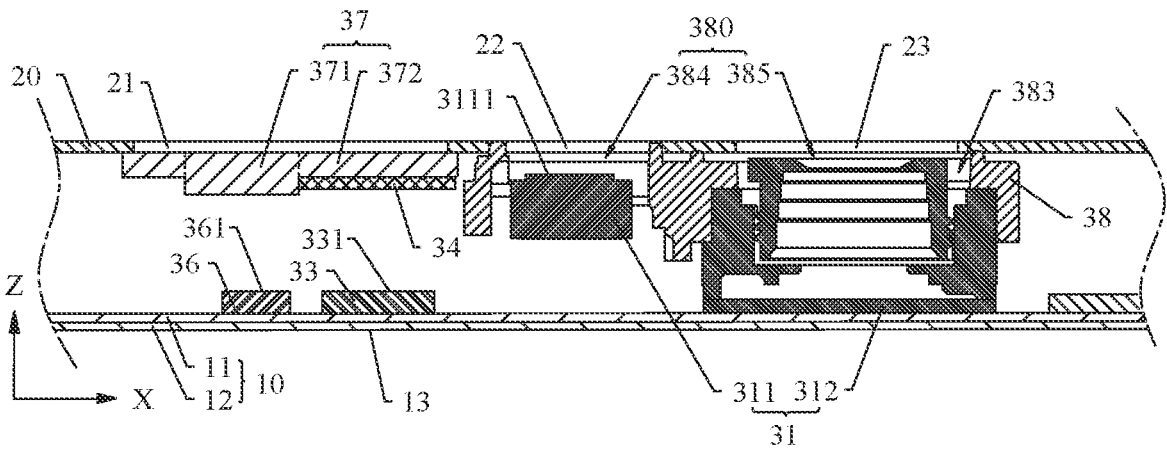
FIG. 4 is a local schematic sectional view of an implementation of the electronic device shown in FIG. 1 at line A-A.

First implementation: FIG. 4 is a local schematic sectional view of an implementation of the electronic device 100 shown in FIG. 1 at line A-A. The light-filtering piece 34 is disposed between the battery cover 20 and flicker detector 33. In this case, the out-light surface 3111 of the infrared laser module 31, the in-light surface 321 of the camera 32 (the in-light surface 321 of the camera 32 is illustrated in FIG. 3), and the in-light surface 331 of the flicker detector 33 face the battery cover 20. The camera 32 is configured to photograph an image on a side of the battery cover 20 that is away from the screen 10, that is, the camera 32 is a rear camera.

In this implementation, the light-filtering piece 34 is disposed between the battery cover 20 and the flicker detector 33. In this way, in a process in which the rear camera and the flicker detector 33 are used in coordination, or in process in which the infrared laser module 31, the flicker detector 33, and the camera 32 are used in coordination, a problem that an image photographed by the rear camera has water ripples is resolved, thereby improving photographing performance of the rear camera of the electronic device 100.

In this implementation, still referring to FIG. 4, the screen 10 includes a display 11 and a cover plate 12 disposed by covering a side of the display 11 that is away from the battery cover 20. The display 11 is configured to display an image. The cover plate 12 is configured to protect the display 11, to avoid damaging the display 1I due to a collision with another object.

Still referring to FIG. 4, the battery cover 20 is provided with a light-transmitting portion 21. Optionally, a material of the battery cover 20 is a transparent material. A partial surface of the battery cover 20 that faces the screen 10 is coated with an ink layer to form a light-shielding portion. A partial surface not coated with an ink layer forms the light-transmitting portion 21. Optionally, the battery cover 20 is provided with a light-transmitting through hole. The light-transmitting through hole forms the light-transmitting portion 21. Optionally, a lens (not shown in the figure) is enclosed by and connected to a hole wall of the light-transmitting through hole, to seal the light-transmitting through hole, thereby preventing external dust or an external water stain of the electronic device 100 from entering an interior of the electronic device 100.

As shown in FIG. 4, the camera assembly 30 includes a flash 36. The flash 36 is configured to fill in light on the photographed subject when the camera 32 (shown in FIG. 3) is in a photographing mode. The flash 36 is located between the screen 10 and the battery cover 20, and an out-light surface 361 of the flash 36 faces the light-transmitting portion 21. The flash 36 and the flash detector 33 are spaced. A projection of the flash 36 on a display surface 13 of the screen 10 partially or totally overlaps a projection of the light-transmitting portion 21 on the display surface 13 of the screen 10. A projection of the light-filtering piece 34 on the display surface 13 of the screen 10 partially or totally overlaps the projection of the light-transmitting portion 21 on the display surface 13 of the screen 10. In other words, light emitted by the flash 36 propagates to the outside of the electronic device 100 through the light-transmitting portion 21. The flicker detector 33 may capture the frequency of the visible light in the external light through the light-transmitting portion 21. In this case, the flicker detector 33 and the flash 36 share one light-transmitting portion 21, to avoid deterioration of user experience of the electronic device 100 resulted from degraded appearance consistency of the battery cover 20 caused by disposing a plurality of light-transmitting portions on the batter cover 20.

With reference to FIG. 1, the flash 36 and the flicker detector 33 are arranged along the length direction of the electronic device 100, to be specific, the flash 36 and the flicker detector 33 are arranged along the Y-axis direction. Further, with reference to FIG. 3, an orientation of the out-light surface 361 of the flash 36, an orientation of the in-light surface 331 of the flicker detector 33, and an orientation of the in-light surface 321 of the camera 32 are the same.

Still referring to FIG. 4, the camera assembly 30 includes an LED cover 37. The LED cover 37 is mounted to the battery cover 20, and the LED cover 37 covers the light-transmitting portion 21. The light-filtering piece 34 and the flash 36 both are located on a side of the LED cover 37 that is away from the battery cover 20, that is, the in-light surface 331 of the flicker detector 33 and the light-emitting surface 361 of the flash 36 both face the LED cover 37.

As shown in FIG. 3, one side of the LED cover 37 is a semicircle and the other side is a chamfered rectangle. In addition, the LED cover 37 is bonded to the battery cover 20 by using a first adhesive layer 373. Because the first adhesive layer 373 is relatively thin, the first adhesive layer 373 is illustrated in FIG. 3 and is omitted in FIG. 4. The first adhesive layer 373 is a ring structure, that is, a middle portion of the first adhesive layer 373 is a hollow-out region. The light emitted by the flash 36 propagates to the outside of the electronic device 100 through the hollow-out region. The flicker detector 33 captures the frequency of the visible light in the external light through the hollow-out region. Therefore, the first adhesive layer 373 does not affect normal work of the flash 36 and the flicker detector 33. In addition, when the light-transmitting portion 21 is a light-transmitting through hole, the LED cover 37 may be built in the light-transmitting through hole, and the first adhesive layer 373 is bonded between a peripheral side surface of the LED cover 37 and a hole wall of the light-transmitting through hole. Moreover, when the first adhesive layer 373 is transparent optical clear adhesive, alternatively, the first adhesive layer 373 may totally cover a surface of the LED cover 37 that faces the battery cover 20, in other words, the first adhesive layer 373 has no hollow-out region. The LED cover 37 fits with the battery cover 20 on a surface by using the first adhesive layer 373.

Still referring to FIG. 4, the LED cover 37 includes a first light-transmitting portion 371 and a second light-transmitting portion 372 connected the first light-transmitting portion 371. The projection of the flash 36 on the display surface 13 of the screen 10 partially or totally overlaps a projection of the first light-transmitting portion 371 on the display surface 13 of the screen 10, in other words, the first light-transmitting portion 371 directly faces the flash 36. It can be understood that, when the flash 36 emits light, the first light-transmitting portion 371 can concentrate the light in a specific region, to effectively fill in light on photographed subject. In addition, the first light-transmitting portion 371 may also soften the light emitted by the flash 36, to prevent the light emitted by the flash 36 from injuring eyes of a photographed person due to excessively high intensity.

In addition, the second light-transmitting portion 372 is disposed, and the second light-transmitting portion 372 is fixed on the battery cover 20, so that the first light-transmitting portion 371 is fixed on the battery cover 20. Therefore, disposing the second light-transmitting portion 372 can ensure that a light concentration function of the first light-transmitting portion 371 is not affected by a fixing mode (for example, when a double-sided tape is directly bonded to the first light-transmitting portion 371, the double-sided tape may affect the light concentration function of the first light-transmitting portion 371) while the first light-transmitting portion 371 can be fixed on the battery cover 20.

In addition, the second light-transmitting portion 372 may be further configured to fix the light-filtering piece 34. In this way, in one aspect, the light-filtering piece 34 is protected by the second light-transmitting portion 372, that is, the light-filtering piece 34 is prevented from colliding with another component in the electronic device 100; and in another aspect, waste of an internal space of the electronic device 100 caused by additionally disposing a space inside the electronic device 100 for fixing the light-filtering piece 34 is avoided, thereby improving internal space utilization of the electronic device 100. Therefore, the second light-transmitting portion 372 has a function of "one for three purposes".

Still referring to FIG. 4, a thickness of the first light-transmitting portion 371 in a first direction is greater than a thickness of the second light-transmitting portion 372 in the first direction. The first direction is a direction perpendicular to the display surface 13 of the screen 10, that is, the first direction is the thickness direction of the electronic device 100, namely, a Z-axis direction.

In this embodiment, the thickness of the second light-transmitting portion 372 in the first direction is less than the thickness of the first light-transmitting portion 371 in the first direction. Therefore, an extra space directly opposite to the second light-transmitting portion 372 can be freed up in the first direction. When the light-filtering piece 34 is fixed on the second light-transmitting portion 372, the light-filtering piece 34 can effectively utilize this part of space, so that waste of an internal space of the electronic device 100 caused by additionally disposing a space inside the electronic device 100 for fixing the light-filtering piece 34 is avoided, thereby improving space utilization of the electronic device 100. In addition, a material used by the second light-transmitting portion 372 is significantly reduced, and input costs of the LED cover 37 are also reduced.

Optionally, the second light-transmitting portion 372 is a ring structure.

Still referring to FIG. 4, the camera assembly 30 includes a mounting bracket 38. A material of the mounting bracket 38 may be but is not limited to hard plastic. The mounting bracket 38 is mounted to the battery cover 20. Optionally, the mounting bracket 38 is fixed on the battery cover 20 by using adhesive.

With reference to FIG. 3, the mounting bracket 38 includes a top wall 381 and a peripheral side wall 382 connected to a peripheral edge of the top wall 381. The mounting bracket 38 has an accommodation space 383. The top wall 381 and the peripheral side wall 382 enclose the accommodation space 383. The top wall 381 of the mounting bracket 38 is provided with a through hole 380. The through hole 380 communicates with the accommodation space 383. The infrared emitted by the infrared laser module 31 propagates to the outside of the electronic device 100 through the through hole 380.

As shown in FIG. 4, the infrared laser module 31 is partially or totally disposed in the accommodation space 383. It can be understood that, when one part of the infrared laser module 31 is located in the accommodation space 383, the other part is located in the through hole 380. In this case, the mounting bracket 38 can protect the infrared laser module 31, to avoid damaging the infrared laser module 31 due to a collision with another component. In addition, when the infrared emitted by the infrared laser module 31 causes optical crosstalk, the mounting bracket 38 can effectively isolate the infrared, to avoid the infrared crosstalk reaching the in-light surface 331 of the flicker detector 33, thereby preventing the infrared emitted by the infrared laser module 31 from interfering with the work of the flicker detector 33.

Optionally, the top wall 381 and the peripheral side wall 382 of the mounting bracket 38 are coated with a light-shielding material. When the infrared laser module 31 emits the infrared, the infrared may be diffused to the interior of the electronic device 100. In this case, the light-shielding material on the top wall 381 and the peripheral side wall 382 can absorb the infrared emitted by the infrared laser module 31, to further ensure that the infrared emitted by the infrared laser module 31 do not cause optical crosstalk to the in-light surface 331 of the flicker detector 33, thereby ensuring the normal work of the flicker detector 33.

Still referring to FIG. 4, the through hole 380 includes a first hole portion 384 and a second hole portion 385 that are spaced. The first hole portion 384 communicates with the accommodation space 383. The second hole portion 385 communicates with the accommodation space 383. The infrared transmitter 311 is partially or totally disposed in the accommodation space 383. The infrared receiver 312 is partially or totally disposed in the accommodation space 383. The infrared transmitter 311 casts infrared to the outside of the electronic device 100 through the first hole portion 384. The infrared receiver 312 receives, through the second hole portion 385, infrared reflected by the photographed subject. It can be understood that, the out-light surface 3111 of the infrared transmitter 311 may be directly opposite to the first hole portion 384, so that infrared is cast to the outside of the electronic device 100 through the first hole portion 384. Certainly, in another embodiment, the out-light surface 3111 of the infrared transmitter 311 may be inclined or be disposed away from the first hole portion 384. In this case, a reflection piece or a refraction piece is disposed between the first hole portion 384 and the infrared transmitter 311, so that the infrared emitted by the infrared transmitter 311 is reflected or refracted out of the electronic device 100. The infrared receiver 312 is disposed in a manner substantially the same as that of the infrared transmitter 311.

With reference to FIG. 3, the first hole portion 384 is substantially rectangular, that is, a shape of the first hole portion 384 adapts to a shape of the infrared transmitter 311. The second hole portion 385 is substantially rectangular, that is, a shape of the second hole portion 385 adapts to the shape of the infrared transmitter 312.

It can be understood that, compared with separately mounting the infrared transmitter 311 and the infrared receiver 312 on the battery cover 20, in this embodiment, the infrared transmitter 311 and the infrared receiver 312 are separately fixed on the mounting bracket 38, and then the mounting bracket 38 is disposed on the battery cover 20. This simplifies assembling processes of the infrared transmitter 311 and the infrared receiver 312, and increases assembling efficiency of the electronic device 100. Further, when the infrared transmitter 311 and the infrared receiver 312 are disposed in the accommodation space 383, the mounting bracket 38 can protect the infrared transmitter 311 and the infrared receiver 312, to avoid damaging the infrared transmitter 311 and the infrared receiver 312 due to a collision with another component. In addition, when the infrared emitted by the infrared transmitter 311 causes optical crosstalk, the mounting bracket 38 can partially isolate the infrared, to avoid the infrared crosstalk reaching the in-light surface 331 of the flicker detector 33, thereby preventing the infrared emitted by the infrared transmitter 311 from interfering with the work of the flicker detector 33. Therefore, the mounting bracket 38 has a function of "one for three purposes".

Optionally, as shown in FIG. 4, one part of the infrared transmitter 311 is located in the accommodation space 383, and the other part is located in the first hole portion 384. In this case, the infrared transmitter 311 may be fixed on the mounting bracket 38 by using a hole wall of the first hole portion 384, that is, the mounting bracket 38 can position the infrared transmitter 311.

Further, still referring to FIG. 4, the battery cover 20 is provided with a first light-through portion 22 and a second light-through portion 23. The infrared transmitter 311 casts infrared to the outside of the electronic device 100 through the first hole portion 384 and the first light-through portion 22. The infrared receiver 312 receives, through the second hole portion 385 and the second light-through portion 23, infrared reflected by the photographed subject.

Optionally, the battery cover 20 is provided with a first light-transmitting through hole and a second light-transmitting through hole that are spaced. The first light-transmitting through hole forms the first light-transmitting portion 22. The second light-transmitting through hole forms the second light-transmitting portion 23. In this case, a part of the mounting bracket 38 extends into the first and second light-transmitting through holes, and the mounting bracket 38 fits with a hole wall of the first light-transmitting through hole and a hole wall surface of the second light-transmitting through hole. Therefore, the mounting bracket 38 can prevent a water stain or dust in the outside of the electronic device 100 from getting inside the electronic device 100 through the hole walls of the first and second light-transmitting through holes. Optionally, the hole walls of the first and second light-transmitting through holes each enclose and are connected to a lens. The lens can be configured to block a water stain or dust in the outside of the electronic device 100 from getting inside the electronic device 100.

As shown in FIG. 3, the mounting bracket 38 includes an optical crosstalk resistance piece 386. A material of the optical crosstalk resistance piece 386 includes a material for absorbing or reflecting infrared. The optical crosstalk resistance piece 386 is located between the first hole portion 384 and the second hole portion 385. When the infrared receiver 312 is in a working state, the optical crosstalk resistance piece 386 can prevent the infrared emitted by the infrared transmitter 311 from reaching the in-light surface of the infrared receiver 312 due to optical crosstalk, thereby preventing the infrared emitted by the infrared transmitter 311 from affecting work of the infrared receiver 312. Further, the top wall 381 is provided with a fixing groove 387. The fixing groove 387 is located between the first hole portion 384 and the second hole portion 385. The optical crosstalk resistance piece 386 is fixed in the fixing groove 387 and extends out of the fixing groove 387.

Figure 5:
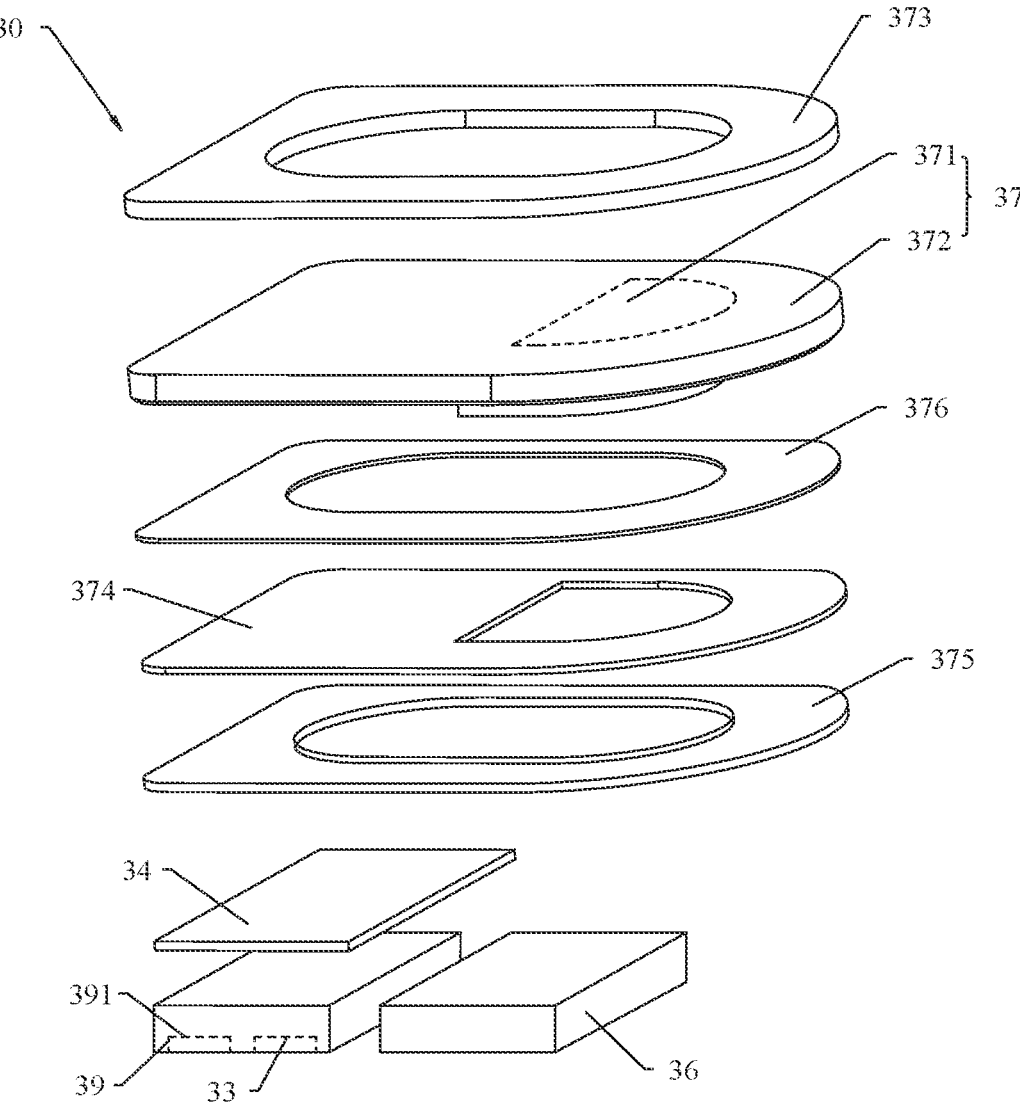
FIG. 5 is a local schematic structural diagram of another implementation of the camera assembly of the electronic device shown in FIG. 2.

In another implementation, technical content that is mostly the same as that in the foregoing implementation is not described again. FIG. 5 is a local schematic structural diagram of another implementation of the camera assembly 30 of the electronic device 100 shown in FIG. 2. The camera assembly 30 includes an ambient light sensor 39. The ambient light sensor 39 and the flicker detector 33 are a two-in-one component. It can be understood that, the ambient light sensor 39 and the flicker detector 33 are integrated into one component, so that the ambient light sensor 39 and the flicker detector 33 form a whole. The ambient light sensor 39 includes an RGB (red green blue, Red Green Blue) sensor. The ambient light sensor 39 is configured to detect a color temperature of the external light.

In addition, as shown in FIG. 5, the second light-transmitting portion 372 is provided with a light-homogenizing film 374. The light-homogenizing film 374 has a shape in which a middle portion is a hollow-out region. The hollow-out region of the light-homogenizing film 374 is configured to allow the first light-transmitting portion 371 to pass through. A light-sensitive surface 391 of the ambient light sensor 39 faces the light-homogenizing film 374. The ambient light sensor 39 is configured to detect the color temperature of the external light that passes through the light-homogenizing film 374. The light-filtering piece 34 is disposed on a surface of the light-homogenizing film 374 that is away from the second light-transmitting portion 372.

Further, as shown in FIG. 5, the camera assembly 30 includes a bonding layer 375. The bonding layer 375 is disposed between the light-homogenizing film 374 and the light-filtering piece 34. The bonding layer 375 is a ring structure, that is, a middle portion of the bonding layer 375 is a hollow-out region. In this case, the bonding layer 375 can stably fix the light-filtering piece 34 on the light-homogenizing film 374 without affecting the flicker detector 33 in detecting the frequency of the visible light and the ambient light sensor 39 in detecting the color temperature of the external light. Specifically, the flicker detector 33 can capture the frequency of the visible light through the hollow-out region of the bonding layer 375, and the ambient light sensor 39 can capture the external light through the hollow-out region of the bonding layer 375. In addition, the bonding layer 375 uses a relatively small amount of material, and this can reduce input costs of the bonding layer 375.

Optionally, the bonding layer 375 is a double-sided tape. A cost of the double-sided tape is relatively low, so that input costs of the electronic device are reduced.

Optionally, the bonding layer 375 is transparent optical clear adhesive. In this case, when the light-filtering piece 34 is fixed on the light-homogenizing film 374 by using the transparent optical clear adhesive, the transparent optical clear adhesive does not affect or change the frequency of the visible light, thereby ensuring the normal work of the flicker detector 33. Moreover, when the bonding layer 375 is transparent optical clear adhesive, the bonding layer 375 may cover a surface of the light-filtering piece 34 that faces the light-homogenizing film 374, in other words, the bonding layer 375 has no hollow-out region. In this case, a contact area between the light-filtering piece 34 and the light-homogenizing film 374 is relatively large, and the light-filtering piece 34 is more securely connected to the light-homogenizing film 374.

Further, the camera assembly 30 includes a second adhesive layer 376. The second adhesive layer 376 is configured to bond the light-homogenizing film 374 to the second light-transmitting portion 372. For a manner of disposing the second adhesive layer 376, refer to that of the bonding layer 375. Details are not described herein again.

Figure 6:
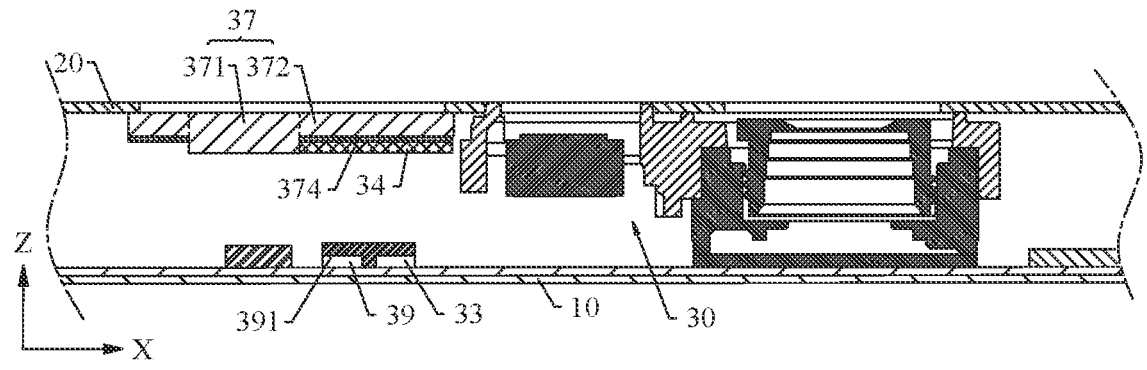
FIG. 6 is a local schematic sectional view of another implementation of the electronic device shown in FIG. 1 at line A-A.

FIG. 6 is a local schematic sectional view of another implementation of the electronic device 100 shown in FIG. 1 at line A-A. When the camera assembly 30 in FIG. 5 is disposed between the screen 10 and the battery cover 20 and the ambient light sensor 39 is in a working state, the ambient light sensor 39 captures external light that sequentially passes through the second light-transmitting portion 372 and the light-homogenizing film 374. In this case, the light-homogenizing film 374 is disposed on the second light-transmitting portion 372 to resolve a problem that the external light is non-uniform due a texture on a surface of the second light-transmitting portion 372, so that the ambient light sensor 39 can capture uniform external light. In addition, the light-filtering piece 34 is fixed on a surface of the light-homogenizing film 374 that faces the flicker detector 33. It can be understood that, the light-homogenizing film 374 is configured to homogenize light. Therefore, the light-homogenizing film 374 does not affect the frequency of the visible light in the external light. In this case, compared with arranging the light-filtering piece 34 and the light-homogenizing film 374 on the X-Y plane, in this embodiment, the light-filtering piece 34 is fixed on the surface of the light-homogenizing film 374 that is away from the second light-transmitting portion 372, so avoid occupying a space of the electronic device 100 on the X-Y plane. In this way, more components can be arranged in the space of the electronic device 100 on the X-Y plane. It can be understood that, because the bonding layer 375 and the second adhesive layer 376 are relatively thin, they are not illustrated in FIG. 6.

Figure 7:
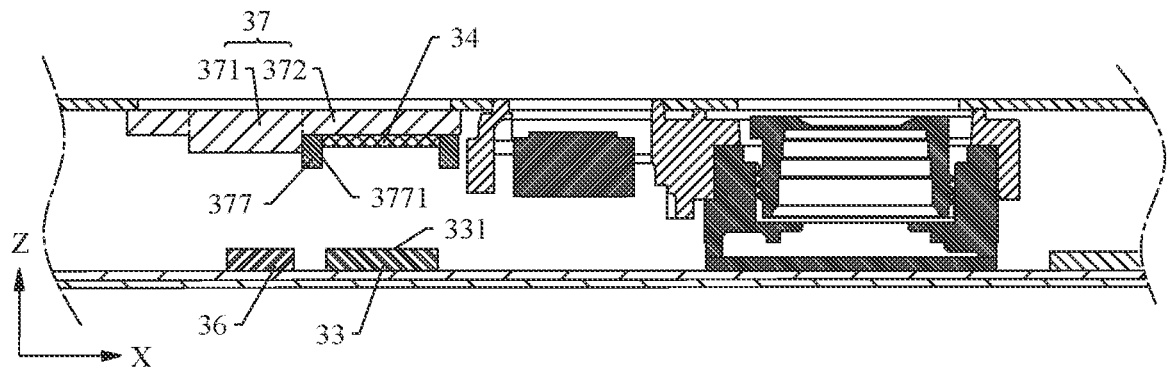
FIG. 7 is a local schematic sectional view of still another implementation of the electronic device shown in FIG. 1 at line A-A.

In still another implementation, technical content that is mostly the same as that in the foregoing implementations is not described again. FIG. 7 is a local schematic sectional view of still another implementation of the electronic device 100 shown in FIG. 1 at line A-A. A positioning block 377 is disposed on a surface of the second light-transmitting portion 372 that faces the flicker detector 33. A peripheral side surface 3771 of the positioning block 377 abuts against the light-filtering piece 34. In this case, the light-filtering piece 34 is clamped by the positioning block 377, so that the light-filtering piece 34 is more securely connected to the second light-transmitting portion 372. It can be understood that, the in-light surface 331 of the flicker detector 33 faces a space enclosed by the positioning block 377, so that the positioning block 377 is prevented from blocking the external light and affecting the capture of the external light on the in-light surface 331 of the flicker detector 33.

Optionally, the positioning block 377 is a ring structure.

Optionally, there are a plurality of positioning blocks 377. The plurality of positioning blocks 377 are distributed at intervals, and the plurality of positioning blocks 377 form a ring structure through enclosure.

Optionally, there is one positioning block 377. The positioning block 377 is a ring structure.

Optionally, a material of the positioning block 377 is the same as that of the second light-transmitting portion 372. In this case, the positioning block 377 is integrally formed with the second light-transmitting portion 372, so that additional input costs can be reduced in one aspect, and impact of the positioning block 377 on the capture of the external light performed by the flicker detector 33 does not need to be considered in another aspect. Certainly, in another embodiment, the positioning block 377 may alternatively be bonded to the second light-transmitting portion 372 by using bonding adhesive.

Optionally, the in-light surface 331 of the flicker detector 33 is located in a space enclosed by the positioning block 377. In this case, the positioning block 377 can isolate infrared radiated by an internal component of the electronic device 100, to ensure that the frequency of the visible light detected by the flicker detector 33 is not interfered with by the infrared emitted by the internal component of the electronic device 100. For example, when the infrared emitted by the infrared transmitter 311 causes optical crosstalk, the positioning block 377 can prevent the infrared from propagating to the in-light surface 331 of the flicker detector 33, thereby preventing the infrared from interfering with the work of the flicker detector 33.

Figure 8:
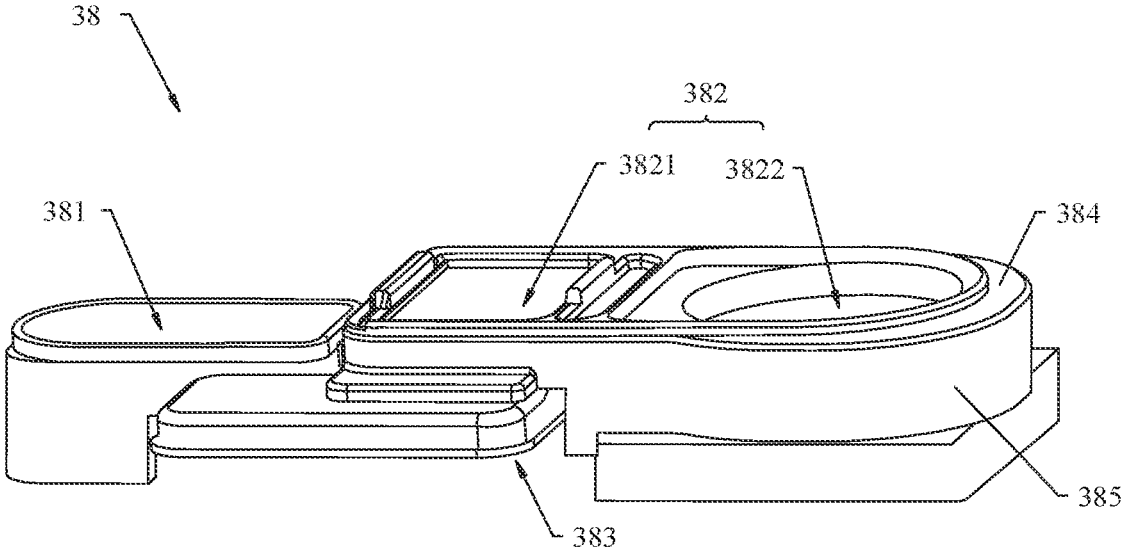
FIG. 8 is a local schematic structural diagram of still another implementation of the camera assembly of the electronic device shown in FIG. 2.

In still another implementation, technical content that is mostly the same as that in the foregoing two implementations is not described again. FIG. 8 is a local schematic structural diagram of still another implementation of the camera assembly 30 of the electronic device 100 shown in FIG. 2. The mounting bracket 38 has an accommodation space 383. The mounting bracket 38 is provided with a first through hole 381 and a second through hole 382 that are spaced. Both the first through hole 381 and the second through hole 382 communicate with the accommodation space 383.

Figure 9:
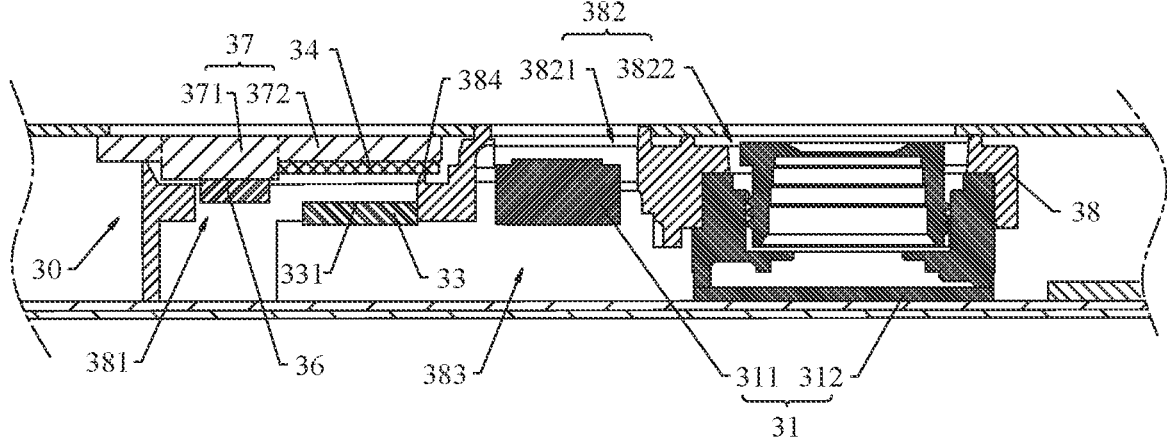
FIG. 9 is a local schematic sectional view of yet another implementation of the electronic device shown in FIG. 1 at line A-A.

FIG. 9 is a local schematic sectional view of yet another implementation of the electronic device 100 shown in FIG. 1 at line A-A. It can be understood that, FIG. 9 is a cross section chart in which the mounting bracket 38 in FIG. 8 is applied to the electronic device 100 and coordinates with another component. The infrared laser module 31 is partially or totally located in the accommodation space 383. The flicker detector 33 is partially or totally located in the accommodation space 383. The first through hole 381 is configured to allow the external light to pass through, so that the external light irradiates the flicker detector 33, that is, the flicker detector 33 captures the frequency of the visible light in the external light through the first through hole 381. The second through hole 382 is configured to allow the infrared emitted by the infrared laser module 31 to pass through, that is, the infrared laser module 31 casts the infrared to the outside of the camera assembly 30 through the second through hole 382.

In this implementation, when the infrared laser module 31 is partially or totally located in the accommodation space 383 and the flicker detector 33 is partially or totally located in the accommodation space 383, the infrared laser module 31, the flicker detector 33, and the mounting bracket 38 form a whole, thereby improving integrity of the camera assembly 30. In addition, the mounting bracket 38 can protect the infrared laser module 31 and the flicker detector 33, to avoid damaging the infrared laser module 31 and the flicker detector 33 due to a collision with another component.

In addition, with reference to FIG. 8, the mounting bracket 38 includes a top wall 384. It can be understood that, the mounting bracket 38 includes a peripheral side wall 385. The peripheral side wall 385 is connected to a peripheral edge of the top wall 384. The top wall 384 and the peripheral side wall 385 enclose the accommodation space 383. An opening of the first through hole 381 and an opening of the second through hole 382 both are located in the top wall 384.

Still referring to FIG. 9, one part of the flicker detector 33 is located in the accommodation space 383, and the other part is located in the first through hole 381. The flicker detector 33 captures the external light through the first through hole 381. In this case, a part of a peripheral side surface of the flicker detector 33 fits with a hole wall surface of the first through hole 381, so that the flicker detector 33 is fixed on the mounting bracket 38, thereby ensuring stability of the flicker detector 33. In addition, because the in-light surface 331 of the flicker detector 33 is located in the first through hole 381, when the infrared emitted by the infrared laser module 31 causes optical crosstalk, a hole wall of the first through hole 381 can effectively isolate the infrared emitted by the infrared laser module 31, to avoid the infrared crosstalk reaching the in-light surface 331 of the flicker detector 33, thereby preventing the infrared emitted by the infrared laser module 31 from interfering with the work of the flicker detector 33.

In addition, the light-filtering piece 34 is mounted on the top wall 384 and covers a part of the first through hole 381. In addition, the light-filtering piece 34 is mounted on the top wall 384 and partially covers the first through hole 381, so that when the infrared emitted by the infrared laser module 31 causes optical crosstalk, the light-filtering piece 34 can filter out infrared that passes through the first through hole 381, to prevent the infrared from entering the in-light surface 331 of the flicker detector 33, that is, prevent the infrared emitted by the infrared laser module 31 from interfering with the work of the flicker detector 33.

Further, still referring to FIG. 9, the flash 36 is disposed in the first through hole 381. The flash 36, the infrared laser module 31, the flicker detector 33, and the mounting bracket 38 form a whole, thereby improving integrity of the camera assembly 30. In addition, the mounting bracket 38 can protect the flash 36, the infrared laser module 31, and the flicker detector 33, to avoid damaging the flash 36, the infrared laser module 31, and the flicker detector 33 due to a collision with another component. Optionally, a peripheral side surface of the flash 36 fits with a hole wall surface of the first through hole 381, so that the flash 36 is positioned by using the hole wall of the first through hole 381. Moreover, compared with separately mounting the flash 36, the infrared laser module 31, and the flicker detector 33 on the battery cover 20, in this embodiment, the flash 36, the infrared laser module 31, and the flicker detector 33 are separately fixed on the mounting bracket 38, and then the mounting bracket 38 is disposed on the battery cover 20. This simplifies assembling processes of the flash 36, the infrared laser module 31, and the flicker detector 33, and increases assembling efficiency of the electronic device 100.

Further, still referring to FIG. 9, the LED cover 37 is mounted on the top wall 384, and covers the first through hole 381. The first light-transmitting portion 371 is partially located in the first through hole 381.

In this implementation, still referring to FIG. 9, the infrared laser module 31 includes an infrared transmitter 311 and an infrared receiver 312. It can be understood that, the infrared transmitter is 311 configured to cast infrared to the photographed subject. The infrared receiver 312 is configured to receive infrared reflected by the photographed subject, and obtain depth information of the photographed subject based on the received infrared. The infrared transmitter 311 is partially or totally located in the accommodation space 383. The infrared receiver 312 is partially or totally located in the accommodation space 383. The second through hole 382 includes a first hole portion 3821 and a second hole portion 3822 that are spaced. The first hole portion 3821 and the second hole portion 3822 communicate with the accommodation space 383. The first hole portion 3821 is configured to allow the infrared emitted by the infrared transmitter 311 to pass through and be cast to the photographed subject, that is, the infrared transmitter 311 casts the infrared to the photographed subject through the first hole portion 3821. The second hole portion 3822 is configured to allow the infrared reflected by the photographed subject to pass through and be cast to the infrared receiver 312, that is, the infrared receiver 312 receives, through the second hole portion 3822, the infrared reflected by the photographed subject. With reference to FIG. 8, the first hole portion 3821 has a rectangular shape. The second hole portion 3822 has a circular shape.

In this embodiment, the first hole portion 3821 and the second hole portion 3822 are disposed, so that when the infrared transmitter 311 emits infrared, the infrared does not directly cause optical crosstalk to an in-light surface of the infrared receiver 312, thereby ensuring normal work of the infrared receiver 312. When the infrared transmitter 311 and the infrared receiver 312 are disposed in the accommodation space 383, the mounting bracket 38 can protect the infrared transmitter 311 and the infrared receiver 312 to avoid damaging the infrared transmitter 311 and the infrared receiver 312 due to a collision with another component.

Figure 10:
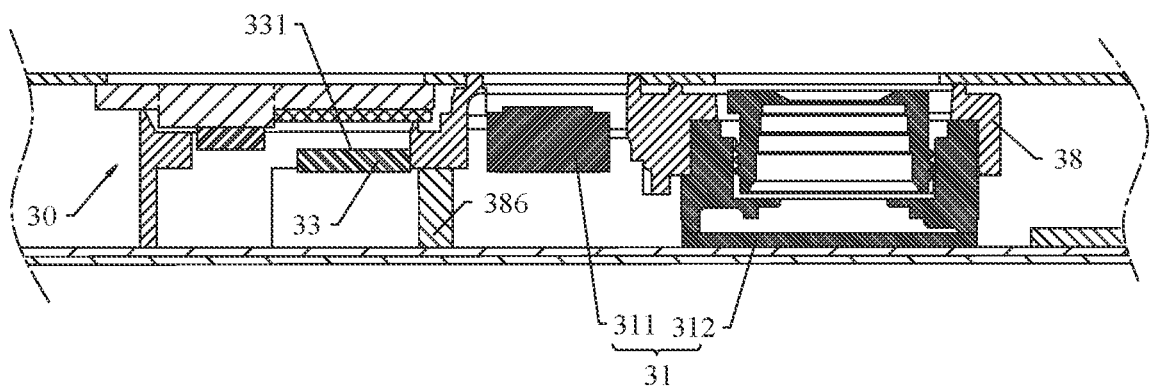
FIG. 10 is a local schematic sectional view of still yet another implementation of the electronic device shown in FIG. 1 at line A-A.

In still yet another implementation, technical content that is mostly the same as that in the foregoing implementations is not described again. FIG. 10 is a local schematic sectional view of still yet another implementation of the electronic device 100 shown in FIG. 1 at line A-A. The mounting bracket 38 is provided with an optical crosstalk resistance piece 386. The optical crosstalk resistance piece 386 is located between the flicker detector 33 and the infrared laser module 31. In addition, when the infrared emitted by the infrared laser module 31 causes optical crosstalk, the optical crosstalk resistance piece 386 can effectively isolate the infrared, to avoid the infrared crosstalk reaching the in-light surface 331 of the flicker detector 33, thereby preventing the infrared emitted by the infrared laser module 31 from interfering with the work of the flicker detector 33.

Further, the optical crosstalk resistance piece 386 is located between the flicker detector 33 and the infrared transmitter 311, to prevent the infrared emitted by the infrared transmitter 311 from causing optical crosstalk to the in-light surface 331 of the flicker detector 33.

Figure 11:
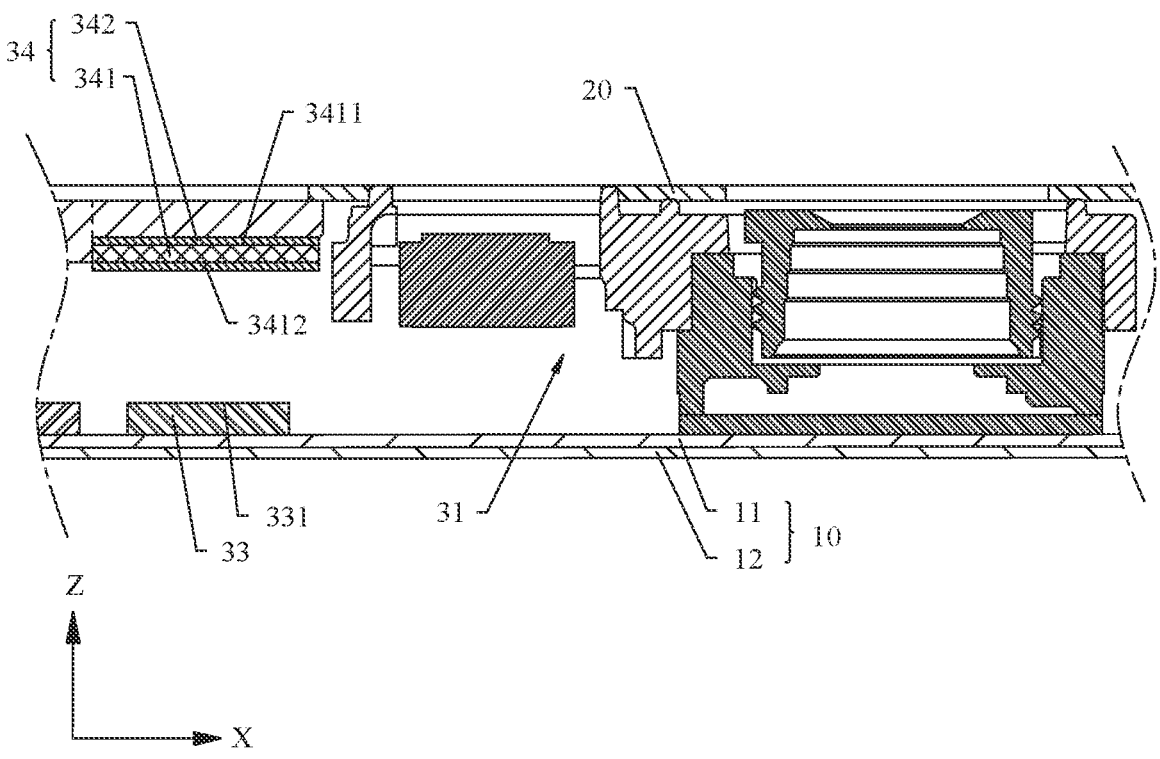
FIG. 11 is a local schematic sectional view of a further implementation of the electronic device shown in FIG. 1 at line A-A.

In a further implementation, technical content that is mostly the same as that in the foregoing implementations is not described again. FIG. 11 is a local schematic sectional view of a further implementation of the electronic device 100 shown in FIG. 1 at line A-A. In this embodiment, the light-filtering piece 34 includes a light-filtering substrate 341 and a light-filtering layer 342 disposed on the light-filtering substrate 341. The light-filtering layer 342 is configured to filter out infrared (including the infrared emitted by the infrared laser module 31). Therefore, when the light-filtering piece 34 covers the in-light surface 331 of the flicker detector 33, the infrared in the external light is filtered out by the light-filtering layer 342, so that the signal of the visible light detected by the flicker detector 33 is not drowned or interfered with by the signal of the infrared, thereby ensuring the normal work of the flicker detector 33.

Further, the light-filtering substrate 341 and the light-filtering layer 342 are configured to filter out the infrared having the wavelength ranging from 800 nanometers to 1600 nanometers.

In this embodiment, the light-filtering substrate 341 includes a first surface 3411 and a second surface 3412 that are oppositely disposed. The first surface 3411 and the second surface 3412 each are provided with the light-filtering layer 342. In this case, when the external light propagates to the light-filtering piece 34, the light-filtering layers 342 on the first surface 3411 and the second surface 3412 both can filter out the infrared in the external light, that is, the light-filtering piece 34 can perform secondary filtering on the external light, thereby improving a light-filtering capability of the light-filtering piece 34. Optionally, the light-filtering substrate 341 includes a peripheral side surface connected between the first surface 3411 and the second surface 3412. The peripheral side surface may also form a light-filtering layer 342.

Further, the light-filtering layer 342 includes a plurality of sequentially stacked film-coated layers (not shown in the figure). A material of the film-coated layers includes at least one of silicon dioxide or titanium dioxide. In this case, the light-filtering layer 342 can filter out 99% of the infrared, that is, most of the infrared in the external light can be filtered out by the light-filtering piece 34. Therefore, when the light-filtering piece 34 is applied to the electronic device 100, the external light filtered by the light-filtering piece 34 does not affect detection work of the flicker detector 33.

Optionally, the film-coated layers may be formed on the light-filtering substrate 341 by using a thermal evaporation process or a magnetron sputtering process.

Optionally, the light-filtering layer 342 includes silicon dioxide layers and titanium dioxide layers that are alternately stacked. Each silicon dioxide layer or titanium dioxide layer forms a film-coated layer.

Further, a material of the light-filtering substrate 341 includes resin for absorbing infrared. A thickness of the light-filtering substrate 341 ranges from 0.05 millimeters to 0.15 millimeters. It can be understood that, when the material of the light-filtering substrate 341 includes resin, the light-filtering substrate 341 can effectively bear the film-coated layers. In addition, with the thickness of the light-filtering substrate 341 set to be in the range of 0.05 millimeters to 0.15 millimeters, the camera assembly 30 can be disposed in a thinned manner when the light-filtering piece 34 is applied to the camera assembly 30. In another embodiment, the material of the light-filtering substrate 341 may alternatively include a glass substrate. A thickness of the light-filtering substrate 341 ranges from 0.1 millimeters to 0.3 millimeters.

Further, the resin is used to absorb infrared. In this case, the light-filtering layer 342 in coordination with the light-filtering substrate 341 can filter out 99.999% of the infrared, that is, the light-filtering piece 34 can filter out almost all infrared in the external light. In this way, infrared in the external light filtered by the light-filtering piece 34 does not affect the detection work of the flicker detector 33.

Optionally, the light-filtering layer 342 in coordination with the light-filtering substrate 341 can allow more than 70% of the visible light to pass through, to ensure that the light-filtering piece 34 does not affect the flicker detector 33 in detecting the frequency of the visible light in the external light.

Figure 12:
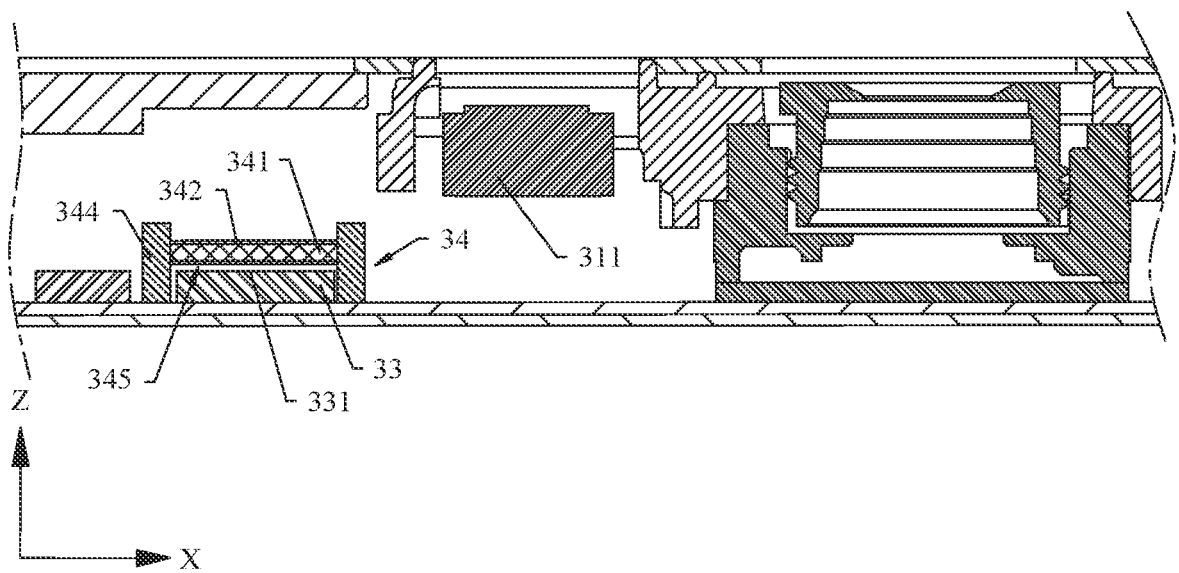
FIG. 12 is a local schematic sectional view of a still further implementation of the electronic device shown in FIG. 1 at line A-A.

Further, FIG. 12 is a local schematic sectional view of a still further implementation of the electronic device 100 shown in FIG. 1 at line A-A. The light-filtering piece 34 includes a base 344. The base 344 is a frame-shaped structure. The base 344 encloses and is connected to a peripheral side surface of the light-filtering substrate 341.

In this embodiment, the base 344 encloses and is connected to the peripheral side surface of the light-filtering substrate 341, to avoid damaging or cracking the light-filtering substrate 341 and the light-filtering layer 342 due to a collision of the light-filtering substrate 341 with an external object.

Optionally, the base 344 is integrally formed with the light-filtering substrate 341. In this case, compared with additionally preparing the base 344 and then mounting the base 344 on the light-filtering substrate 341, in this embodiment, the base 344 is integrally formed with the light-filtering substrate 341 to reduce a preparation process of the light-filtering piece 34, thereby reducing input costs of the light-filtering piece 34.

Further, an inner side of the base 344 encloses a light-filtering space 345. The in-light surface 331 of the flicker detector 33 is located in the light-filtering space 345, that is, the in-light surface 331 of the flicker detector 33 is covered by the light-filtering piece 34. In this case, when a peripheral component (for example, the infrared transmitter 311) of the flicker detector 33 emits infrared, the base 344 can effectively isolate this part of infrared, to prevent the infrared radiated by the peripheral component from affecting the work of the flicker detector 33, thereby ensuring that an image photographed by the camera 32 has no water ripples.

Optionally, the base 344 encloses and is connected to the peripheral side surface of the light-filtering substrate 341 detachably. In this case, when the base 344 is damaged or cracked, the base 344 can be detached from the light-filtering substrate 341 to facilitate replacement with a new base 344, in other words, replacing the entire light-filtering piece 34 is avoided, thereby reducing the input costs of the light-filtering piece 34.

Optionally, a hardness of the base 344 is higher than that of the light-filtering substrate 341. In this case, because the base 344 is not prone to damage, the light-filtering piece 34 has better stability.

Figure 13:
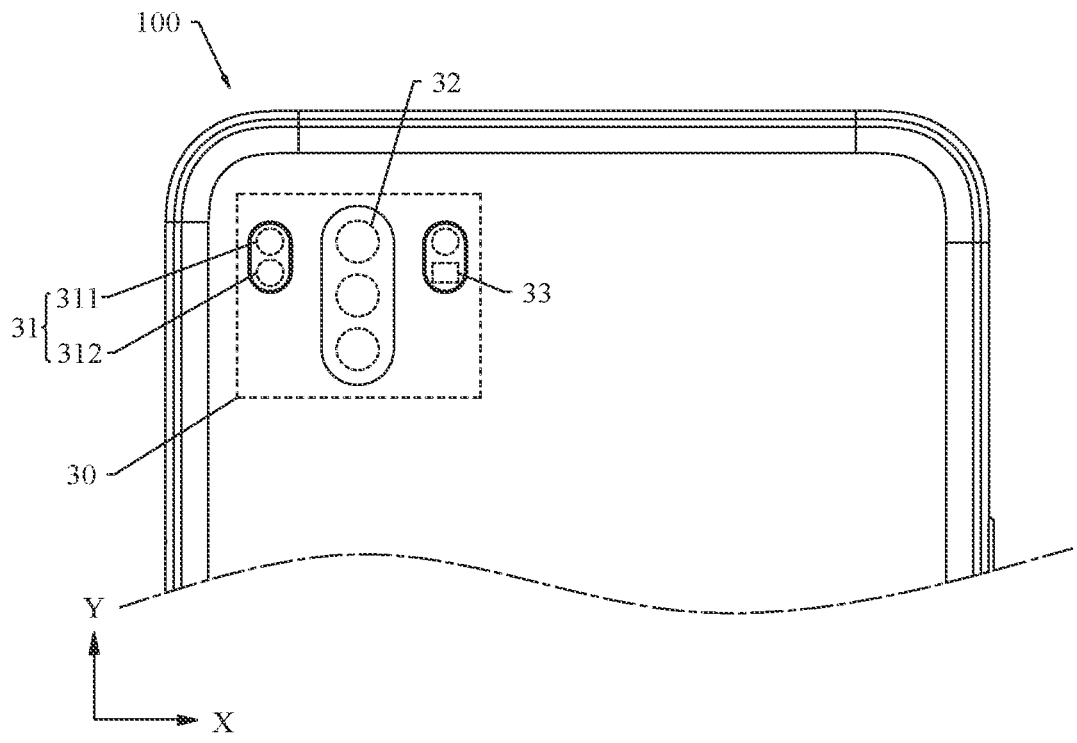
FIG. 13 is a schematic structural diagram of another implementation of an electronic device according to an embodiment of this application.

In another implementation, technical content that is mostly the same as that in the foregoing implementation is not described again: FIG. 13 is a schematic structural diagram of another implementation of the electronic device 100 according to an embodiment of this application. The infrared laser module 31, the camera 32, and the flicker detector 33 are sequentially arranged along the width direction of the electronic device 100, to be specific, the infrared laser module 31, the camera 32, and the flicker detector 33 are sequentially arranged along the X-axis direction. In this case, the camera 32 is located between the infrared laser module 31 and the flicker detector 33, and the camera 32 can effectively isolate the infrared emitted by the infrared laser module 31. Specifically, when the infrared emitted by the infrared laser module 31 causes optical crosstalk, the camera 32 can prevent the infrared crosstalk from reaching the flicker detector 33, so that the infrared emitted by the infrared laser module 31 is prevented from interfering with the work of the flicker detector 33, thereby ensuring that an image photographed by the camera 32 has no water ripple. In another embodiment, arrangement positions of the infrared laser module 31, the camera 32, and the flicker detector 33 may not be specifically limited.

Further, as shown in FIG. 13, the infrared transmitter 311 and the infrared receiver 312 are arranged along the length direction of the electronic device 100, to be specific, the infrared transmitter 311 and the infrared receiver 312 are arranged along the Y-axis direction. In this case, the infrared transmitter 311, the infrared receiver 312, the camera 32, and the flicker detector 33 are arranged centrally in one region, thereby increasing internal space utilization of the electronic device 100.

Figure 14:
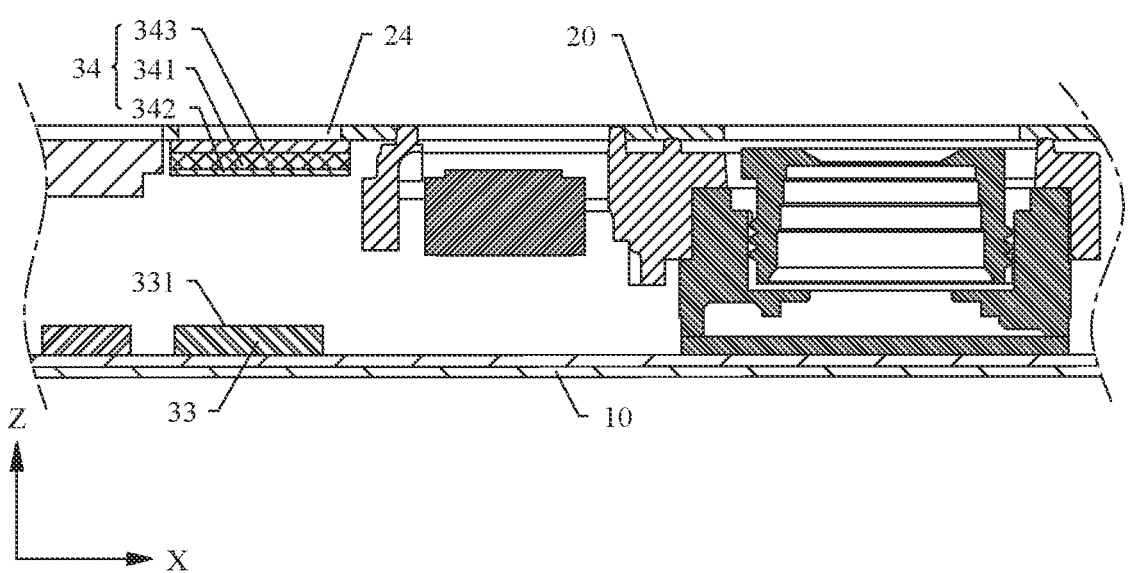
FIG. 14 is a local schematic sectional view of a yet further implementation of the electronic device shown in FIG. 1 at line A-A.

In the second implementation, a technology that is mostly the same as that in the first implementation is not described again: FIG. 14 is a local schematic sectional view of a yet further implementation of the electronic device 100 shown in FIG. 1 at line A-A. The light-filtering piece 34 is fixed on the surface of the battery cover 20 that faces the screen 10. In this case, the flicker detector 33 detects the frequency of the visible light in the external light filtered by the light-filtering piece 34. In this embodiment, the light-filtering piece 34 is directly fixed on the surface of the battery cover 20 that faces the screen 10, to save an internal space of the electronic device 100 by avoiding additionally disposing a fixing piece or a mounting bracket inside the electronic device 100 for fixing the light-filtering piece 34, thereby increasing space utilization of the electronic device 100. Optionally, the light-filtering piece 34 is fixed on the surface of the battery cover 20 that faces the screen 10 by using adhesive. In this case, the light-filtering piece 34 fits tightly with the battery cover 20, so that the light-filtering piece 34 and the battery cover 20 are arranged in a more compact manner, to be specific, an internal space of the electronic device 100 is not wasted because no large space is left between the light-filtering piece 34 and the battery cover 20. In addition, with the light-filtering piece 34 bonded to the battery cover 20, a process is simple and an operation is convenient.

Still referring to FIG. 14, the battery cover 20 is provided with a light-transmitting portion 24. The light-filtering piece 34 covers the light-transmitting portion 24. The light-filtering piece 34 is configured to filter out infrared in external light that passes through the light-transmitting portion 24. Optionally, when the battery cover 20 is a transparent material, a partial surface of the battery cover 20 that faces the screen 10 is coated with an ink layer to form a light-shielding portion. A surface not coated with an ink layer forms the light-transmitting portion 24. The light-filtering piece 34 is bonded to the battery cover 20 and covers the light-transmitting portion 24. In another implementation, the battery cover 20 is provided with a first light inlet to form the light-transmitting portion 24.

Still referring to FIG. 14, the light-filtering piece 34 includes transparent optical clear adhesive 343. The transparent optical clear adhesive 343 is disposed on a side of the light-filtering substrate 341 that is away from the light-filtering layer 342. The transparent optical clear adhesive 343 is bonded to the surface of the battery cover 20 that faces the screen 10. Therefore, compared with additionally providing an adhesion agent and fixing the light-filtering piece 34 by using the adhesion agent, in this embodiment, the transparent optical clear adhesive 343 is disposed on the side of the light-filtering substrate 341 that is away from the light-filtering layer 342, so that when the light-filtering piece 34 is fixed on the battery cover 20, the transparent optical clear adhesive 343 is directly bonded to the battery cover 20, thereby improving convenience in using the light-filtering piece 34. In addition, with the light-filtering piece 34 bonded to the battery cover 20 by using the transparent optical clear adhesive 343, a process is simple and an operation is convenient.

In another implementation, the surface of the battery cover 20 that faces the screen 10 is provided with an anti-explosion film (not shown in the figure). The light-filtering piece 34 is fixed on a surface of the anti-explosion film that faces the flicker detector 33. In this case, when the battery cover 20 falls off and hits another object, the anti-explosion film can avoid damaging the battery cover 20. In this case, when the light-filtering piece 34 is fixed on the surface of the anti-explosion film that faces the flicker detector 33, damage to the light-filtering piece 34 caused by fall-off of the electronic device 100 can be avoided. In another implementation, the battery cover 20 is provided with a non conductive vacuum metalization (non conductive vacuum metalization, NCVM) film. The light-filtering piece 34 is fixed on a surface of the NCVM film that faces the flicker detector 33.

Figure 15:
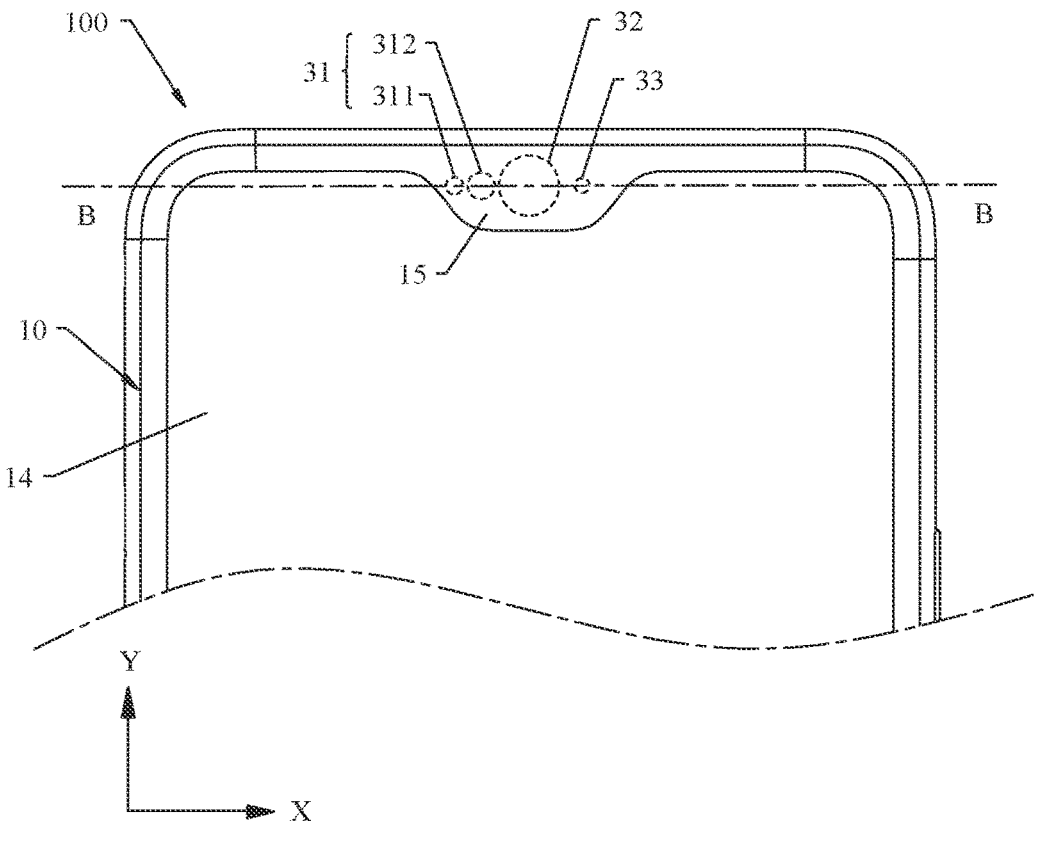
FIG. 15 is a schematic structural diagram of still another implementation of an electronic device according to an embodiment of this application.

In the third implementation, technical content that is mostly the same as that in the first implementation and the second implementation is not described again: FIG. 15 is a schematic structural diagram of still another implementation of the electronic device 100 according to an embodiment of this application. The flicker detector 33 is configured to capture light on a same side as the screen 10. In addition, the infrared laser module 31 and the camera 32 are also configured to capture the external light on the same side as the screen 10. The camera 32 is configured to take a selfie, that is, the camera 32 can photograph a face of the user.

Further, as shown in FIG. 15, the screen 10 includes a display region 14 and a non-display region 15 that encloses a peripheral edge of the display region 14. The display region 14 can be configured to display an image. The flicker detector 33 is located in the non-display region 15. In this case, the flicker detector 33 captures the frequency of the visible light in the external light in non-display region 15. Therefore, the flicker detector 33 does not affect image display in the display region 14 when the flicker detector 33 is in a working state. In addition, compared with disposing the flicker detector 33 in the display region 14, in this embodiment, the light-filtering piece 34 is disposed in the non-display region 15, so that a larger space can be freed up in a space in which the display region 14 is located. In this way, when the freed space is used for arranging more components, the electronic device 100 has more functions.

Optionally, the non-display region 15 includes a "notch-shaped" black edge region. The infrared laser module 31, the camera 32, and the flicker detector 33 are sequentially arranged along the width direction of the electronic device 100. The infrared laser module 31, the camera 32, and the flicker detector 33 are all arranged in the "notch-shaped" black edge region.

Optionally, the non-display region includes a "droplet-shaped" black edge region. In this case, the infrared laser module 31, the camera 32, and the flicker detector 33 are arranged in the "droplet-shaped" black edge region.

Figure 16:
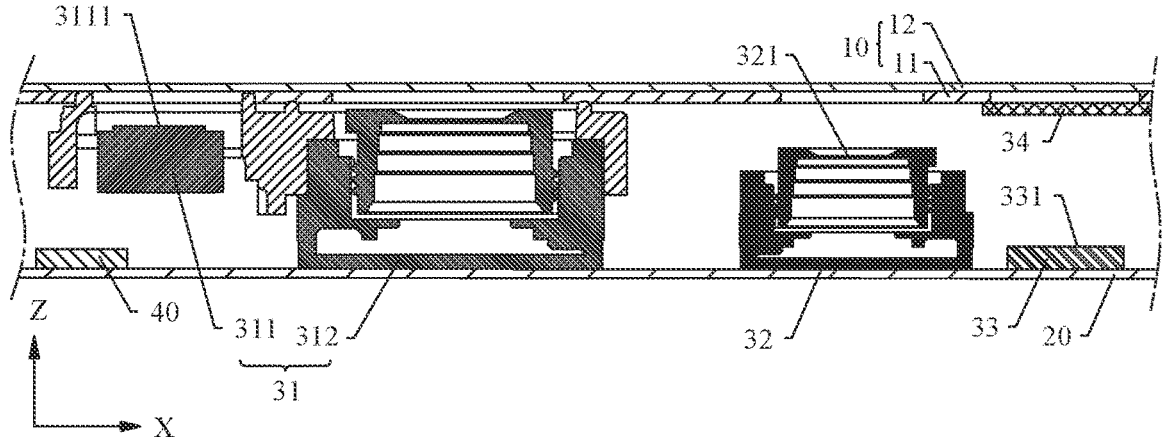
FIG. 16 is a local schematic sectional view of the electronic device shown in FIG. 15 at line B-B.

FIG. 16 is a local schematic sectional view of the electronic device 100 shown in FIG. 15 at line B-B. The light-filtering piece 34 is disposed between the screen 10 and the flicker detector 33. In this case, the out-light surface 3111 of the infrared laser module 31, the in-light surface 321 of the camera 32, and the in-light surface 331 of the flicker detector 33 face the screen 10. The camera 32 is a front camera. In this implementation, the infrared laser module 31 includes the infrared transmitter 311 and the infrared receiver 312. The out-light surface 3111 of the infrared transmitter 311 faces the screen 10.

In this implementation, the light-filtering piece 34 is disposed between the screen 10 and the flicker detector 33. In this way, in a process in which the front camera and the flicker detector 33 are used in coordination, or in process in which the infrared transmitter 311, the infrared receiver 312, the flicker detector 33, and the front camera are used in coordination, a problem that an image photographed by the front camera has water ripples is resolved, thereby improving a photographing effect of the front camera of the electronic device 100.

Still referring to FIG. 16, in this case, the user may photograph a facial image with depth information through coordinated use of the infrared transmitter 311, the infrared receiver 312, the flicker detector 33, the light-filtering piece 34, and the front camera, and the facial image has no water ripples. Specifically, the infrared transmitter 311 casts infrared to the face of the user that needs to be photographed. Then, the infrared receiver 312 receives infrared to obtain accurate depth information of the face of the user that needs to be photographed. Before the flicker detector 33 detects the frequency of the visible light in the external light, the infrared reflected by the photographed subject is filtered out by the light-filtering piece 34. In this case, the frequency of the visible light captured by the flicker detector 33 is not interfered with by the infrared emitted by the infrared transmitter 311. The flicker detector 33 converts the captured frequency of the visible light into the electrical signal, and sends the electrical signal to the controller 40. The controller 40 controls the camera 32 to adjust the photographing parameter and capture a color image of the face of the user. The depth information of the face is combined with the color image for processing to form a color image with depth information, and the color image has no water ripple. Because the facial image captured by the electronic device 100 has accurate information, the facial image may be used for power-on verification of the electronic device 100 or identity verification in a payment process.

Still referring to FIG. 16, the light-filtering piece 34 is fixed on a surface of the screen 10 that faces the flicker detector 33. Optionally, the light-filtering piece 34 is fixed on a surface of the screen 10 that faces the battery cover 20 by using adhesive. In this case, the light-filtering piece 34 fits tightly with the screen 10, so that the light-filtering piece 34 and the screen 10 are arranged in a more compact manner, to be specific, an internal space of the electronic device 100 is not wasted because no large space is left between the light-filtering piece 34 and the screen 10. In addition, with the light-filtering piece 34 bonded to the screen 10, a process is simple and an operation is convenient.

Optionally, the light-filtering piece 34 is located in the non-display region 15. In addition, compared with disposing the light-filtering piece 34 in the display region 14, in this embodiment, the light-filtering piece 34 is disposed in the non-display region 15, so that a larger space can be freed up in a space in which the display region 14 is located. In this way, when the freed space is used for arranging more components, the electronic device 100 has more functions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera assembly, comprising
an infrared laser system comprising an out-light surface and configured to emit infrared light that propagates outside of the camera assembly through the out-light surface;
a camera comprising a first in-light surface;
a flicker detector comprising a second in-light surface, wherein the out-light surface, the first in-light surface, and the second in-light surface face a same direction and are staggered from each other such that the out-light surface, the first in-light surface, and the second in-light surface do not overlap;
a mounting bracket comprising a first through hole, wherein the flicker detector is partially disposed in the first through hole such that the second in-light surface of the flicker detector is located inside the first through hole; and
a light-filtering piece comprising:
a light-filtering substrate comprising:
a first surface; and
a second surface disposed opposite to the first surface;
a light-filtering layer disposed on each of the first surface and the second surface of the light-filtering substrate and configured to filter out the infrared light having a wavelength ranging from 800 nanometers to 1600 nanometers; and
a base configured to:
enclose and connect to a peripheral side surface of the light-filtering substrate;
cover the second in-light surface of the flicker detector; and
filter out the infrared light from external light, wherein the flicker detector is configured to detect a frequency of visible light in the external light.
2. The camera assembly of claim 1, wherein the light-filtering layer comprises a plurality of sequentially stacked film-coated layers, and wherein a material of the film-coated layers comprises titanium dioxide.
3. The camera assembly of claim 1, wherein the light-filtering layer comprises a plurality of sequentially stacked film-coated layers, and wherein a material of the film-coated layers comprises silicon dioxide.

4. The camera assembly of claim 1, wherein a material of the light-filtering substrate comprises resin, and wherein a thickness of the light-filtering substrate ranges from 0.05 millimeters to 0.15 millimeters.
5. The camera assembly of claim 1, wherein the base is a frame-shaped structure.
6. The camera assembly of claim 1, wherein the camera assembly further comprises an ambient light sensor configured to detect a color temperature of the external light, and wherein the ambient light sensor and the flicker detector are a two-in-one component.
7. The camera assembly of claim 1, wherein the camera assembly further comprises the mounting bracket having an accommodation space, wherein the infrared laser system is disposed in the accommodation space, wherein the mounting bracket is provided with a second through hole, and wherein the second through hole communicates with the accommodation space and is configured to allow the infrared light to pass through.
8. The camera assembly of claim 1, wherein the mounting bracket comprises an accommodation space, wherein the mounting bracket is provided with the first through hole and a second through hole that are spaced and communicate with the accommodation space, wherein the infrared laser system and the flicker detector are located in the accommodation space, wherein the first through hole is configured to allow the external light to pass through to irradiate the flicker detector, and wherein the second through hole is configured to allow the infrared light to pass through.
9. The camera assembly of claim 8, wherein the flicker detector is entirely disposed in the first through hole.
10. The camera assembly of claim 8, wherein the mounting bracket comprises a top wall, wherein an opening of the first through hole and an opening of the second through hole are located in the top wall, and wherein the light-filtering piece is mounted on the top wall and covers a part of the first through hole.
11. The camera assembly of claim 8, wherein the mounting bracket is provided with an optical crosstalk resistance piece, wherein a material of the optical crosstalk resistance piece comprises a material for absorbing or reflecting the infrared light, and wherein the optical crosstalk resistance piece is located between the flicker detector and the infrared laser system.
12. The camera assembly of claim 9, wherein the infrared laser system comprises an infrared transmitter and an infrared receiver, wherein the infrared transmitter and the infrared receiver are located in the accommodation space, wherein the second through hole comprises a first hole portion and a second hole portion that are spaced, wherein the first hole portion and the second hole portion communicate with the accommodation space, wherein the first hole portion is configured to allow the infrared light to pass through and be cast to a photographed subject, and wherein the second hole portion is configured to allow the infrared light reflected by the photographed subject to pass through and be cast to the infrared receiver.
13. The camera assembly of claim 1, wherein the camera comprises a photographing parameter, and wherein the photographing parameter comprises an exposure time.
14. The camera assembly of claim 1, wherein the camera is configured to capture a color image of a photographed subject.
15. The camera assembly of claim 14, wherein the infrared laser system is configured to obtain depth information of the photographed subject.

16. The camera assembly of claim 15, further comprising an image processor configured to:

receive the depth information; and receive the color image of the photographed subject.

17. The camera assembly of claim 1, wherein the light-filtering piece comprises transparent optical clear adhesive.

18. The camera assembly of claim 1, wherein the camera assembly further comprises an ambient light sensor configured to detect a color temperature of the external light that passes through a light-homogenizing film.

19. The camera assembly of claim 1, further comprising a controller separately electrically connected to the camera and the flicker detector, wherein the flicker detector is further configured to:

convert the frequency of the visible light into an electrical signal; and sends the electrical signal to the controller.

20. The camera assembly of claim 19, wherein the controller is configured to:

receive the electrical signal; and adjust a photographing parameter of the camera based on the electrical signal.

* * * * *